United States Patent [19]

Brekkestran et al.

[11] Patent Number: 4,855,913
[45] Date of Patent: Aug. 8, 1989

[54] ELECTRONIC CONTROL SYSTEM FOR POWERSHIFT TRANSMISSION

[75] Inventors: Kevin L. Brekkestran; John C. Thomas, both of Fargo, N. Dak.

[73] Assignee: J. I. Case Company, Racine, Wis.

[21] Appl. No.: 55,820

[22] Filed: May 29, 1987

[51] Int. Cl.[4] .................... B60K 41/08; B60K 41/18
[52] U.S. Cl. .................... 364/424.1; 74/866
[58] Field of Search ............ 74/866; 364/424.1, 74

[56] References Cited

U.S. PATENT DOCUMENTS

| | | |
|---|---|---|
| 3,465,614 | 2/1968 | Reynolds . |
| 3,710,630 | 1/1973 | Sumiyoshi et al. ........... 74/866 X |
| 3,710,651 | 1/1973 | Marumo et al. ........... 74/866 X |
| 3,748,926 | 7/1973 | Mohri et al. ........... 74/866 X |
| 4,019,614 | 4/1977 | Prenzel et al. . |
| 4,031,782 | 6/1977 | Miller et al. ........... 74/866 |
| 4,037,697 | 7/1977 | Prenzel . |
| 4,072,220 | 2/1978 | Hamada . |
| 4,199,048 | 4/1980 | Ishikawa . |
| 4,208,929 | 6/1980 | Heino et al. . |
| 4,228,880 | 10/1980 | Gee . |
| 4,295,551 | 10/1981 | Zimmermann et al. . |
| 4,338,832 | 7/1982 | Pelligrino . |
| 4,354,236 | 10/1982 | Miki et al. . |
| 4,361,060 | 11/1982 | Smyth . |
| 4,388,666 | 7/1982 | Suzuki et al. . |
| 4,425,620 | 1/1984 | Batcheller et al. . |
| 4,425,992 | 1/1984 | Makita . |
| 4,444,297 | 4/1984 | Parsons . |
| 4,474,082 | 10/1984 | Spokas et al. . |
| 4,475,637 | 10/1984 | Oguma et al. . |
| 4,479,399 | 10/1984 | Narveson et al. . |
| 4,487,303 | 12/1984 | Boueri et al. . |
| 4,509,625 | 4/1985 | Tellert . |
| 4,514,811 | 4/1985 | Daubenmier et al. . |
| 4,527,678 | 7/1985 | Pierce et al. . |
| 4,561,055 | 12/1985 | McKee . |
| 4,594,666 | 6/1986 | Cornell . |

FOREIGN PATENT DOCUMENTS 0028555 2/1987 Japan ................... 74/866

*Primary Examiner*—Eugene R. LaRoche
*Assistant Examiner*—Nathan W. McCutcheon
*Attorney, Agent, or Firm*—Dykema Gossett

[57] ABSTRACT

A microprocessor-based electronic control system for a powershift transmission having at least one proportional actuator, such as a solenoid-operated proportional valve, is disclosed. The controller operates a plurality of on-off solenoid valves and the solenoid-operated proportional valve to provide operator-selected gear shifts in both forward and reverse directions having controlled clutch engagements achieved by modulation of clutch engagement pressure by the proportional valve. The key parameters associated with the gradual clutch engagement are all easily varied by the controller, most under program control during operation, to provide for optimized clutch engagments for smooth gearshifts. The key parameters include: fast-fill clutch delay, initial clutch engagement pressure, rate of increase of clutch engagement pressure, and the length of the reduced pressure clutch engagement interval. The electronic controller also automatically modifies selected parameters in accordance with sensed changes in temperature, magnetic flux coupling between solenoids, and variations in the voltage supply provide to the series combination of the solenoid coil of proportional valve and its solenoid driver circuit. Preferred methods of operating the electronic controller and powershift transmission are also disclosed.

4 Claims, 14 Drawing Sheets

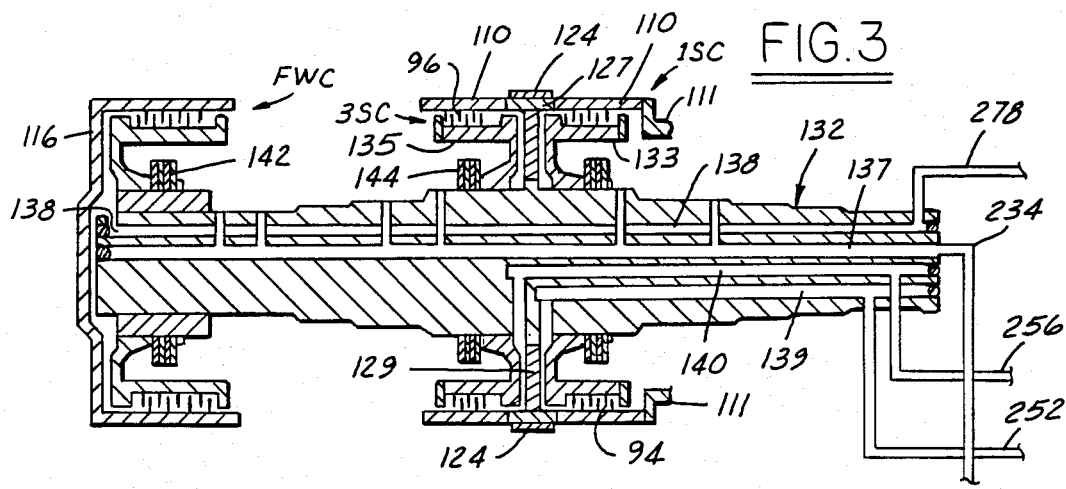
FIG. 3
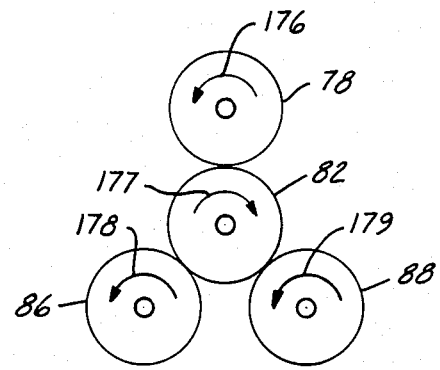
FIG. 4
FIG. 6
| VALVE 22 | SOLENOIDS REQUIRED | | | | | |
|---|---|---|---|---|---|---|
| GEAR ↳ | a | b | c | d | e | f |
| SELECTION | 1SS | 2SS | 3SS | FCS | RCS | PMS |
| NEUTRAL | | | | | | |
| REV 1 | X | | | | X | |
| REV 2 | | X | | | X | |
| REV 3 | | | X | | X | |
| REV 4 | | | | | X | |
| FWD 1 | X | | | X | | |
| FWD 2 | | X | | X | | |
| FWD 3 | | | X | X | | |
| FWD 4 | | | | X | | |
X = SOLENOIDS ENERGIZED
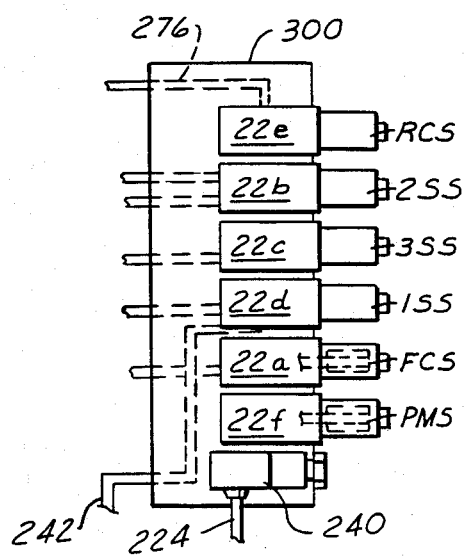
FIG. 7

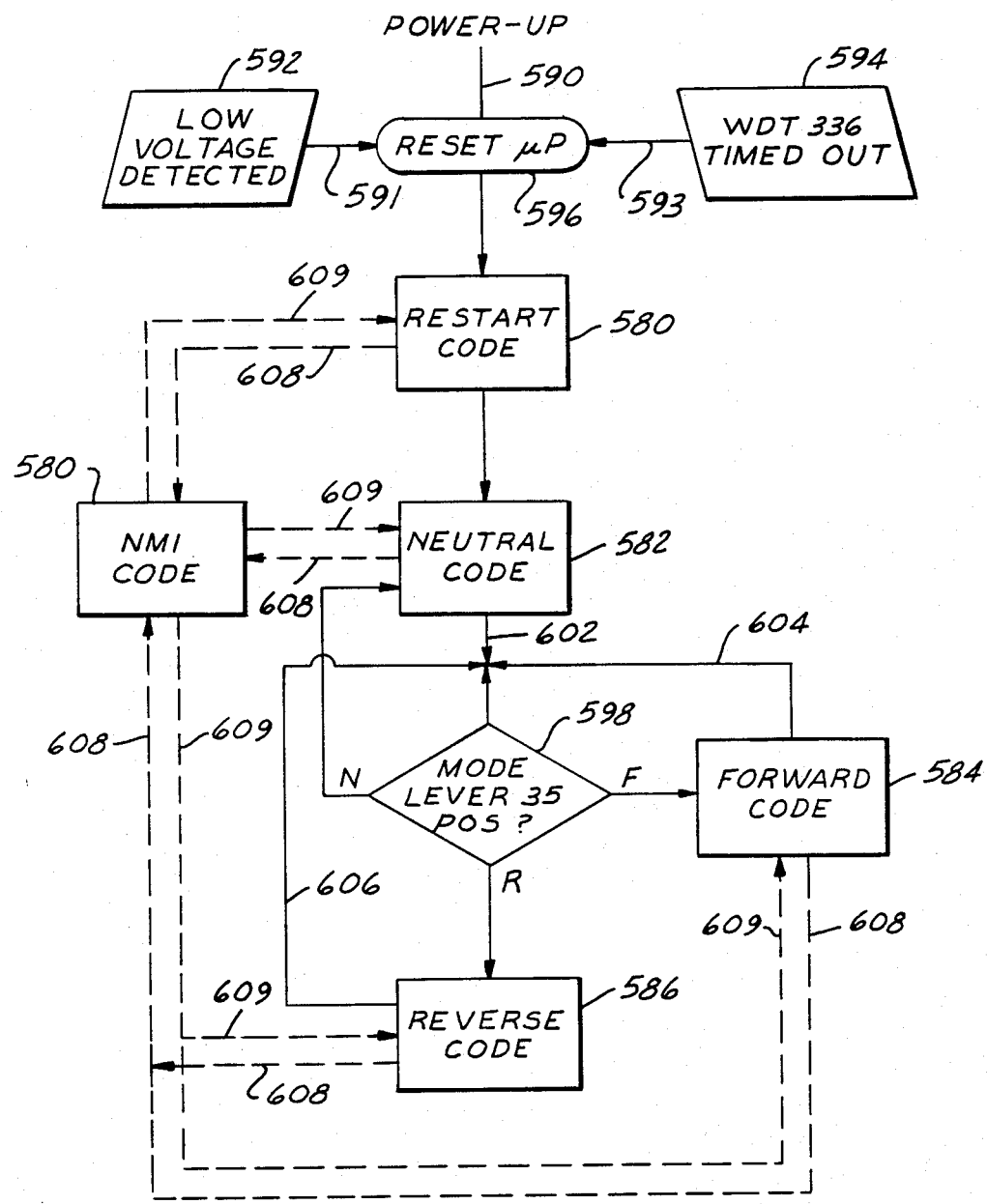

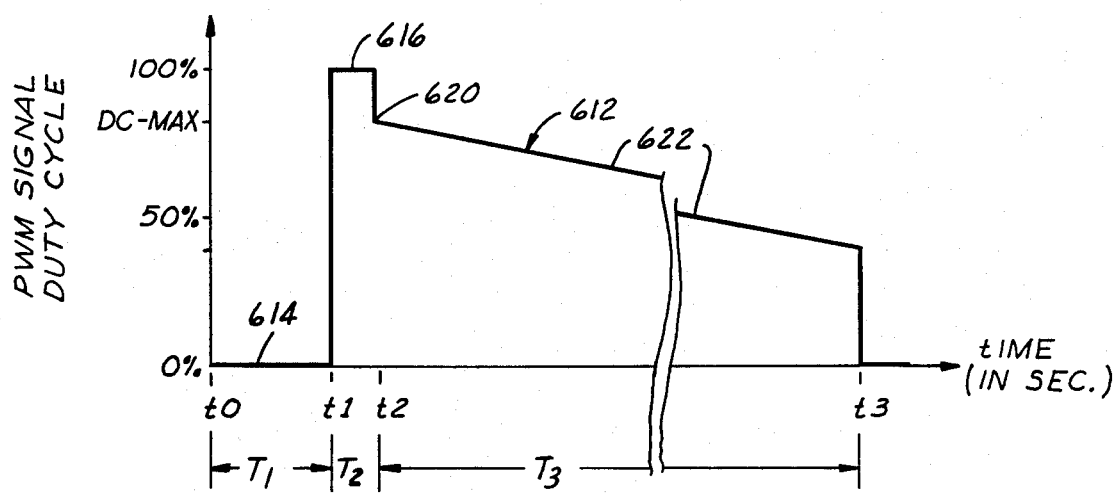
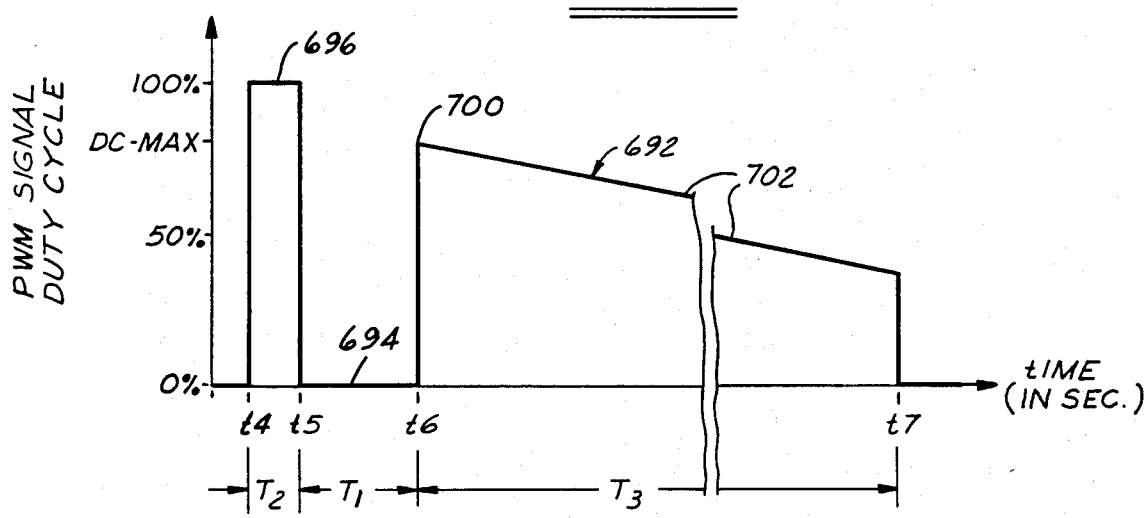

FIG. 18

| | | GEAR SHIFTS | | TIME DELAY $T_1$ (IN MSEC) | NOM VALUE OF DC-MAX $D_{NSV}$ (IN %) | DECAY RATE DR (IN %/SEC) | TIME DELAY $T_3$ (IN SEC) | NO. OF CLUTCHES TO BE FILLED | ROW NO. |
|---|---|---|---|---|---|---|---|---|---|
| | | FROM | TO | | | | | | |
| NORMAL ONE-GEAR SHIFTS | FORWARD UPSHIFTS | NEUT | FWD 1 | 130 | 75 | 21.5 | 2.0 | 2 | 1 |
| | | FWD 1 | FWD 2 | 55 | 75 | 28.3 | 1.5 | 1 | 2 |
| | | FWD 2 | FWD 3 | 55 | 75 | 35.4 | 1.2 | 1 | 3 |
| | | FWD 3 | FWD 4 | 55 | 75 | 35.4 | 1.2 | 1 | 4 |
| | FORWARD DOWN-SHIFTS | FWD 1 | NEUT | — | — | — | — | 0 | 5 |
| | | FWD 2 | FWD 1 | 55 | 75 | 28.3 | 1.5 | 1 | 6 |
| | | FWD 3 | FWD 2 | 55 | 75 | 35.4 | 1.2 | 1 | 7 |
| | | FWD 4 | FWD 3 | 55 | 75 | 35.4 | 1.2 | 1 | 8 |
| | REVERSE UPSHIFTS | NEUT | REV 1 | 130 | 85 | 17.0 | 2.5 | 2 | 9 |
| | | REV 1 | REV 2 | 55 | 85 | 21.5 | 2.0 | 1 | 10 |
| | | REV 2 | REV 3 | 55 | 85 | 23.6 | 1.8 | 1 | 11 |
| | | REV 3 | REV 4 | 55 | 85 | 23.6 | 1.8 | 1 | 12 |
| | REVERSE DOWN-SHIFTS | REV 1 | NEUT | — | — | — | — | 0 | 13 |
| | | REV 2 | REV 1 | 55 | 85 | 21.5 | 2.0 | 1 | 14 |
| | | REV 3 | REV 2 | 55 | 85 | 23.6 | 1.8 | 1 | 15 |
| | | REV 4 | REV 3 | 55 | 85 | 23.6 | 1.8 | 1 | 16 |
| SHUTTLE SHIFTS | FORWARD TO REVERSE SHIFTS | FWD 1 | REV 1 | 75 | 85 | 18.8 | 2.3 | 1 | 17 |
| | | FWD 2 | REV 2 | 75 | 85 | 16.3 | 2.6 | 1 | 18 |
| | | FWD 3 | REV 3 | 75 | 85 | 16.7 | 2.7 | 1 | 19 |
| | | FWD 4 | REV 4 | 75 | 85 | 16.7 | 2.7 | 1 | 20 |
| | REVERSE TO FORWARD SHIFTS | REV 1 | FWD 1 | 75 | 75 | 21.5 | 2.0 | 1 | 21 |
| | | REV 2 | FWD 2 | 75 | 75 | 18.8 | 2.3 | 1 | 22 |
| | | REV 3 | FWD 3 | 75 | 75 | 16.3 | 2.6 | 1 | 23 |
| | | REV 4 | FWD 4 | 75 | 75 | 15.2 | 2.8 | 1 | 24 |
| SKIP SHIFTS | FORWARD UPSHIFTS | NEUT | FWD 2 | 130 | 75 | 22.3 | 1.9 | 2 | 25 |
| | | NEUT | FWD 3 | 130 | 75 | 21.5 | 2.0 | 2 | 26 |
| | | NEUT | FWD 4 | 75 | 75 | 19.3 | 2.2 | 1 | 27 |
| | REVERSE DOWN-SHIFTS | NEUT | REV 2 | 130 | 85 | 20.2 | 2.1 | 2 | 28 |
| | | NEUT | REV 3 | 130 | 85 | 18.8 | 2.3 | 2 | 29 |
| | | NEUT | REV 4 | 75 | 85 | 16.3 | 2.6 | 1 | 30 |
| | COLUMN NO | 1 | 2 | 3 | 4 | 5 | 6 | 7 | |

ELECTRONIC CONTROL SYSTEM FOR POWERSHIFT TRANSMISSION

BACKGROUND OF THE INVENTION

1. Field of the Invention

The present invention relates in general to electrical and electronic control systems for transmissions in engine-driven vehicles and powertransmitting apparatuses used in off-road vehicles, and in particular to electronic control systems for transmissions.

2. Description of the Prior Art

In the past, power transmission have been developed in which the transmission gear ratios are selected by electrical signals provided to solenoid valves. In large off-road vehicles, such as agricultural tractors front-end loaders, road graders and the like, it is desirable to provide a large number of forward and reverse gear ratios. Due to the size of these transmissions, and the problems of mechanically linking operator-actuated controls to the transmissions, it is often preferred to select transmission gear ratios entirely by the operation of solenoid valves, as is done in a typical powershift transmission. The rate of clutch engagement in such transmission is very dependent upon hydraulic and mechanical controls such as orifices and one or more accumulators, which in general are not very effective for providing smooth or jolt-free gear shifts under all conditions. Even when such conventional engagement controls are set up for relatively smooth engagement of the powershift transmission in one application, it is difficult to tailor the clutch pressure modulation characteristics to other applications. Also, where relatively soft engagements are provided, this is often achieved by excessively prolonged engagement times or other undesirable characteristics. It may be possible to optimize a few gear shifts, for example, of the many possible gear shifts, but the remaining gear shifts may be either rather too fast, and therefore rough, or too slow.

In many transmission systems, clutch pedals are provided so that the operator may manually control the rate of clutch engagement. However, in off-road vehicles, such as those designed for certain agricultural or construction equipment applications, gear shifts occur frequently, and over the course of a day represent a significant source of operator fatigue. Also, in such manually-controlled transmissions, unnecessary torque overloads or excessive clutch wear results whenever the operator misjudges, or due to inexperience, inattentiveness or fatigue is unable to provide the proper rate of clutch engagement.

The assignee of the present invention has been engaged in the development of microprocessor-based controllers for powershift transmissions for a number of years, and has deveoped electronic controllers which electrically actuate the various solenoid-operated hydraulic valves to select the desired transmission gear ratios in response to operator commands. For example, in U.S. Pat. No. 4,425,620 to Bachelor et al. entitled "Electronic Control for Power Shift Transmission," which is hereby incorporated by reference, there is disclosed a microprocessor-based electrical control system which has a mode select lever and a upshift-/downshift pulser lever by which the operator may indicate the desired vehicle direction and gear in which the powershift transmission is to be operated. However, this control system does not provide an electronically controlled gradual engagement of the clutches of the powershift transmission during gear shifts, and simply operates the solenoids in an on-off manner. The patent does not address or recognize the possibility of directly controlling or modulating hydraulic pressures in the transmission so as to produce smooth, optimized clutch engagements during gear shifts.

The use of proportional actuator devices, such as hydraulic valves operated by torque motors is known in the agricultural and construction equipment art. Such proportional actuation devices are frequently operated by pulse width modulated (PWM) signals whose duty cycle is varied in proportion to the desired average or DC value desired to be produced by the actuator means. However, as far as we are presently aware, such proportional actuation devices have not been used on powershift transmissions before the present invention. This may in be due in part ot the inherent problem associated with using such relatively delicate or sensitive equipment which must be finely controlled in the rugged and environmentally severe conditions to which a typical powershift transmission in an off-road vehicle is exposed. In the development of the present invention, applicants encountered a number of unexpected problems which had to be overcome to successfully apply the concept of utilizing a PWM solenoid valve as a proportional actuator device in a powershift transmission to obtain the controlled clutch engagements necessary to achieve smooth gear shifts under a wide variety of operating conditions.

Accordingly, a primary object of the present invention is to provide a electronic control system for a powershift transmission which utilizes a proportional actuation means, such as a proportional hydraulic valve operated by a solenoid supplied with an alternating electrical signal, such as a PWM signal, to automatically control the hydraulic system of the transmission to provide gradual clutch engagements required for smooth, efficient gear shifts.

Another important object of the invention is to provide an electronic control system which allows a number of key parameters to be quickly adjusted and stored in the memory of microprocessor means, so that the operation of proportional actuation devices associated with hydraulic valves within a powershift transmission can be readily tailored to fit almost any vehicle application to provide for quick and smooth clutch engagements.

Yet another object is to provide an electronic control system which can customize the clutch engagements in a powershift transmission for virtually all gear shifts.

Still another object of the present invention is to provide a control system which automatically compensates for a number of variables which would otherwise detrimentally influence the quality of clutch engagements in a powershift transmission, including changes in temperature of the transmission and solenoids and in the magnetic coupling between adjacent solenoid coils of the solenoid-operated hydraulic valves.

One more object of the present invention is to eliminate the need to provide a separate voltage regulation supply to feed electrical power to a proportional solenoid used in an off-road vehicle, by providing for automatic adjustment of the duty cycle of the PWM signal driving the proportional solenoid which counteracts changes in or drifting of the nominal voltage in the vehicle's electrical supply system.

SUMMARY OF THE INVENTION

In light of the foregoing problems and objects, there is provided, according to one aspect of the present invention, an electronic improved control system for a powershift transmission having a plurality of hydraulically-actuated clutches and a plurality of electrically-operated hydraulic valves for selecting the clutches for engagement, each such valve being provided with electrical coil means for operating the valve. The control system comprises: first electrical switching means for providing a first electrical signal to a first electrical coil means associated with a first hydraulic valve for selecting a first clutch of the transmission for engagement; second electrical switching means for providing a second electrical signal which is a proportional signal to a second electrical coil means associated with a second hydraulic valve for adjusting the hydraulic pressure applied to the first clutch during the engagement thereof; microprocessor means for operating the power shift transmission in accordance with operating parameters stored within the microprocessor means, the operating parameters including a first parameter corresponding to a reduced hydraulic pressure to be applied to the first clutch during the initial engagement thereof. The microprocessor means includes first output means for controlling the first electrical switching means, and second output means for controlling the second electrical switching means. It also includes means for causing the second electrical signal to command the second hydrauilc valve to adjust the hdyraulic pressure applied during initial engagmeent of the clutch in accordance with a stored value of the first parameter. The second electrical signal is preferably a pulse width modulated (PWM) signal. The first and second electrical coil means are preferably solenoid coils, and the first and second electrical switching means may be and preferably are substantially identical in construction. The operating parameters stored within the microprocessor preferably also include a second parameter corresponding to the maximum length of time reduced hydraulic pressures to be applied to the first clutch during engagement thereof, and a third stored parameter corresponding to the rate which hydraulic pressure applied to the first clutch during engagement thereof is to be increased from the reduced pressure applied during the initial engagement of the first clutch. A third stored parameter may also be provided for providing a predetermined time delay between the application of the first electrical signal to the first electrical coil means and the application of the second electrical signal to the second electrical coil means. This time delay allows the clutch pack of the clutch to be engaged to fill with hydraulic fluid at a high flow rate caused by normal hydraulic pressure, which is then reduced in value at the point where the clutch pack is filled and the clutch begins to engage.

According to a second aspect of the invention there is provided an electronic control system for a powershift transmission that has a plurality of gears having different gear ratios and a plurality of hydraulically-actuated clutches for engaging and disengaging the gears by locking and unlocking the gears to shafts within the transmission. The transmission also includes the electrically-operated hydraulic valves and electrical coil means for operating each valve described according to the first aspect of the present invention. The control system of the second aspect comprises: first electrical switching means for providing a first electrical signal to a first electrical coil means associated with the first hydrauilc valve for selecting a first cltuch of the transmission for engagement; second electrical means for providing a second electrical signal to a second electrical coil means associated with a second hydraulic valve for selecting a second clutch of the transmission for engagement; third electrical switching means for providing a third electrical signal which is a proportional signal to a third electrical coil means associated with a third hydraulic valve for adjustng the hydraulic pressure applied during the engagement of the first clutch and during the engagement of the second clutch. The control system further comprises microprocessor means for operating the powershift transmission in accordance with operating parameters stored within the microprocessor means said operating parameters including first and second stored values of a first parameter corresponding to a desired characteristic of hydraulic operation to be achieved during engagement of the first clutch and during engagement of the second clutch, the first and second values being distinct from one another. The microprocessor means also includes first output means for controlling the first electrical switching means, second output means for controlling the second electrical switching means, third output means for controlling the third electrical switching means, and means for causing the third electrical signal to command the third hydraulic valve to adjust the hydraulic pressure applied during engagement of the first and second clutches respectively in accordance with the first and second values of the first stored parameter.

According to a third aspect of the present invention, there is provided an electronic control system for compensating for the effective temperature changes in a powershift transmission having at least one electrically-operated proportional hydraulic valve means for adjusting at least one parameter within the transmission. The electronic control system comprises: first electronic switching means for providing to the solenoid coil a first electrical signal which is an alternating electrical signal corresponding to a desired value of the parameter; means for sensing the value of a second parameter indicative of the approximate temperature of the transmission; means for determining the difference between an expected value of the second parameter at a predetermined temperature of the transmission and the sensed value of the second parameter; and means for adjusting the first electrical signal in response to the determined difference to compensate for the effective temperature changes in the transmission. In this control system the first electrical signal is preferably a pulse width modulated (PWM) signal.

According to a fourth aspect of the present invention, there is provided an electronic control system for compensating for the effect of magnetic coupling between at least two solenoid coils in a powershift transmission having a plurality of hydraulically-actuated clutches and plurality of electrically-operated hydraulic valve means for selecting the clutches. Each such valve clutch means includes a solenoid coil to operate the valve. The electronic control system comprises: first electrical switching means for providing to a first one of the solenoid coils associated with a hydraulic valve which is a proportional modulation device a first electrical signal; second electrical switching means for providing to a second one of the solenoid coils located adjacent to the first solenoid coils, a second electrical signal, whereby magnetic flux is produced by the second one of the solenoid coils which affects by magnetic coupling the intended operation of the first coil; means for determining whether such magnetic coupling is present; and means for compensating for the effect of such magnetic coupling between the second and first ones of the solenoid coils by adjusting the first signal so as to counteract the effect of such flux coupling.

According to a fifth aspect of the present invention, there is provided an improved electronic control system for use with a powershift transmission. The electronic control system is of the type which includes electronic switching means connectable in series with a solenoid coil of a hydraulic valve means used to adjust at least one parameter with the transmission. The electronic switching means and solenoid coil form a series combination to which a DC supply voltage is applied across. The improvement in the electronic control system comprises in combination: sensing means for determining the actual value of the supply voltage provided across the series combination of the solenoid coil and the electronic switching means; means for determining the difference between the actual value of the supply voltage and a predetermined nominal voltage value of the supply voltage; and compensation means for adjusting the second signal in inverse proportion to the value of the difference, thereby compensating for variation in the supply voltage.

According to a seventh aspect of the present invention, an electronic control system for compensating for the effect of temperature changes in the transmission, for the effect of magnetic coupling between solenoids, and for variations in the supply voltage, is provided by combining the various features of the third, fourth and fifth aspects of the present invention.

Although the foregoing aspects of the present invention have been developed for use in conjunction with a powershift transmission, we recognize the applicability of a number of the foregoing aspects of the present invention to power-transmitting apparatuses, particularly those for use in or with an off-road vehicle, which have solenoid-operated hydrauilc valves as actuator means.

In all of the foregoing aspects of the present invention, it is preferred to provide microprocessor means, including memory means for program storage for operating the power-transmitting apparatus in accordance with operating parameters stored in the memory means. In each aspect of the present invention, at least one of the stored operating parameters preferably represents a value corresponding to either a proportional alternating signal such as a PWM signal, or the magnitude of an adjustment made in response to a sensed condition, such as temperature, flux coupling between solenoids, or voltage variation.

While the foregoing aspects of the present invention have been described in terms of electronic control systems for accomplishing various tasks, we believed that the methods employed by or implemented with the control systems of the present invention represent novel approaches to the problems addressed by and solved by the present invention, and thus these methods constitute part of our invention.

These and other aspects, objects, features and advantages of the present invention will be more fully understood from the following detailed description and appended claims, taken in conjunction with the drawings.

BRIEF DESCRIPTION OF THE DRAWINGS

In the accompanying drawings, where identical reference numerals or reference characters represent like items shown in the various Figures:

FIG. 3 is a cross-sectional view of a shaft used in one of the two stages of the FIG. 2 transmission;

FIG. 4 is a front view schematic diagram of the heat set gears of the FIG. 2 transission;

FIG. 6 is a table showing the solenoids which must be energized to select the various forward and reverse gears in the FIG. 2 transmission;

FIG. 7 is a simplified plan view of the hydraulic valve manifold with the six solenoid-operated valves shown disposed adjacent one another;

FIG. 14 is a generalized flowchart showing the overall organization of the software used with the electronic system of the present invention;

FIG. 15 is a graph showing the duty cycle of the electrical signal supplied to the pulse width modulation solenoid during engagement of a typical hydraulically-actuated clutch in the FIG. 2 transmission, such electrical signal being produced by the FIG. 1 control system;

FIG. 17 is an alternate duty cycle versus time graph for the electrical signal applied to the pulse width modulation solenoid during engagement of a hydraulically-actuated clutch in the FIG. 2 transission;

FIG. 18 is a table listing gear shifts which can be provided by the FIG. 1 control system, and illustrating that different values of four different parameters may be set for each individual gear shift.

DETAILED DESCRIPTION OF THE PREFERRED EMBODIMENTS

Figure 1:
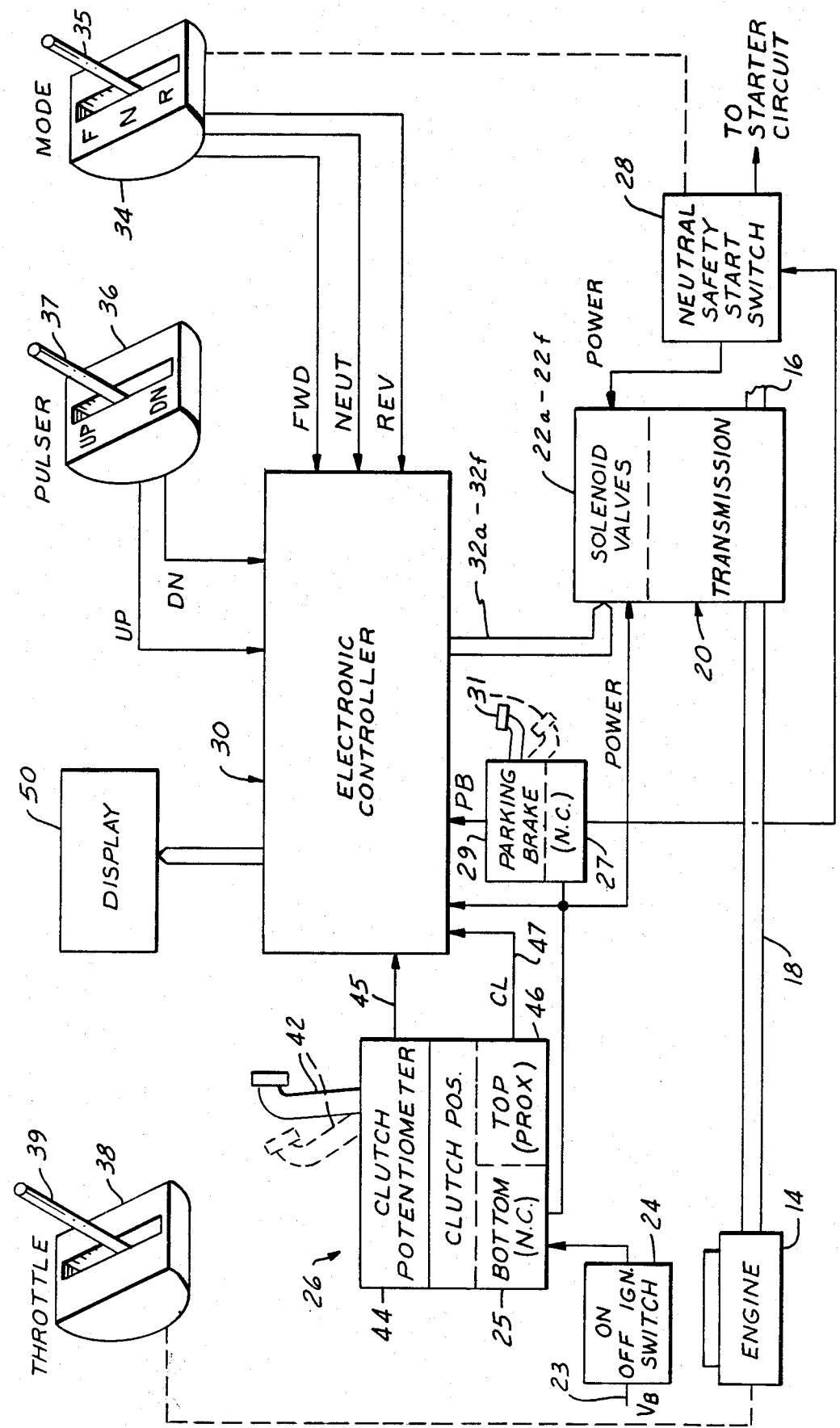
FIG. 1 is a block diagram illustrating the transmission control system of the present invention.

The Vehicle Drive System (FIG. 1)

A drive system of an off-road vehicle which utilizes the transmission control system of the present invention is illustrated in FIG. 1. The vehicle's drive system includes internal combustion engine 14 which supplies the power to output drive shaft 16 through a drive train including input drive shaft 18 and transmission 20. In the preferred embodiments of the present invention, the transmission 20 is of the type which has a plurality of gear ratios which are selected by actuation of selected solenoid valves. A total of four forward gears and four reverse gears are provided. Transmission 20 has six clutches as shown in Table 1:

TABLE 1

| Clutch Name | Clutch I.D. |
| --- | --- |
| forward directional clutch | FDC |
| reverse directional clutch | RDC |
| first gear speed clutch | 1SC |
| second gear speed clutch | 2SC |
| third gear speed clutch | 3SC |
| fourth gear speed clutch | 4SC |

In order to engage any forward gear or any reverse gear, two clutches must be engaged, namely the appropriate directional clutch and the appropriate speed gear clutch. For example, to place the transmission 20 into the third forward gear, both the forward directional clutch and third gear speed clutch must be engaged. Engaging speed clutch without also engaging one of the directional clutches effectively results in the transmission being in neutral, since the input shaft and the output shaft of the transmission will not be coupled together.

In this preferred embodiment of the present invention, there are a total of six solenoid valves 22a-22f, one or two of which must be actuated at any one time to select a particular gear ratio. Electrical power to all of the solenoid valves is provided from vehicle electrical supply line 23, having a direct current (DC) supply voltage $V_B$ such as approximately +12 volts supplied from the vehicle's normal electrical power supply system (not shown), through the vehicle's OFF-ON-IGN switch 24, and a normally closed switch 25 located on the manual clutch engagement control 26. The electrical power for the solenoids which cause the engagement of the directional clutches is further routed through a switch 27 on a parking brake control 29 actuated by applying parking brake lever 31, and a neutral safety start switch 28, connected as shown. Electronic controller 30 selects the gear ratio of transmission 20 by selectively providing a ground connection through solenoid control lines 32a-32f to solenoids of solenoid-operated valves 22a-22f. The function of each valve 22 is listed in Table 2, along with the mnemonic used to identify its respective solenoid.

TABLE 2

| Valve Ref. No. | Solenoid Ref. Symbol | Function of Valve When Its Solenoid Is Energized |
| --- | --- | --- |
| 22a | 1SS | engages first speed clutch 1SC |
| 22b | 2SS | engages second speed clutch 2SC |
| 22c | 3SS | engages third speed clutch 3SC |
| 22d | FCS | engages forward dir. clutch FDC |
| 22e | RCS | engages reverse dir. clutch RDC |

TABLE 2-continued

| Valve Ref. No. | Solenoid Ref. Symbol | Function of Valve When Its Solenoid Is Energized |
| --- | --- | --- |
| 22f | PMS | provides proportional modulation of hydraulic pressure during engagement of clutches FDC and RDC |

The configuration and operation of valves 22, their solenoids and the electrical circuits driving solenoid control lines 32 will be fully explained later.

The driver or operator of the vehicle provides input signals to controller 30 by means of mode select control 34, upshift/downshift control 36 and an optional manual clutch engagement control 26. Mode select control 34 has a three-position, detented mode select lever 35 movable between a center neutral (N or NEUT) position, a reverse (R or REV) position, and a forward (F or FWD) position. Electrical signals are supplied from mode select control lever 35 to controller 30 which causes controller 30 to select the proper operating mode. Mode select lever 35 also controls neutral safety start switch 28. When mode select lever 35 is in the N position, it causes neutral start switch 28 to disconnect power from the solenoid valves 22 which select the forward directional clutch or reverse directional clutch for engagement. At the same time, neutral start switch 28 provides electrical power to starter circuitry (not shown) for starting engine 14. Mode select lever 35 and start switch 28, therefore ensure the transmission is in neutral whenever the lever is in the neutral position, regardless of the state of solenoid control lines 32.

Upshift/downshift control 36 has a three-position, spring-returned-to-center pulser lever 37 which provide upstift pulses (UP) and downshift pulses (DN) to controller 30. In its center or normal position, pulser lever 37 does not produce upshift or downshift pulses. When lever 37 is moved forward into its UP position, an upshift pulse is provided. If the driver maintains lever 37 in the upshift position, no additional pulses are produced. To obtain further upshifts, the lever must be returned to its UP position and then to its forward position. Similarly, movement of pulser lever 37 in a rearward direction to its DN position produces one downshift pulse. To obtain another downshift pulse the lever 37 must be returned to neutral and then into its DN position. (If desired, the holding of the lever 37 in either UP position or DN position could alternatively provide further upshift pulses or downshift pulses respectively at predetermined time intervals until lever 37 is returned to its normal position.) The upshift and downshift pulses from control 36 are used by controller 30 to upshift or downshift transmission 20. There upshifts and downshifts can occur when the select lever 35 is in either the forward position or the reverse position, and also preferably can occur when lever 35 is in its neutral position. Suitable mechanical constructions for the mode control 34 and the pulser control 36 are shown in detail in the aforementioned U.S. Pat. No. 4,425,620, with the various needed proximity sensor and microswitches required to produce electrical pulses mounted thereon.

Throttle control 38 has a throttle lever 39 which is mechanically or otherwise linked in conventional manner to engine 14 to control the speed of engine 14. Manual clutch engagement control 26 includes a pivotable lever such as spring-returned clutch foot pedal 42, whose position is monitored by clutch pedal potentiometer 44 and proximity sensor or switch 46. The sensor 46 detects the pressure of the clutch pedal 42 at the top of its travel, when the pedal is not depressed at all. An analog signal on line 45 is provided to the controller 30 by potentiometer 44. A digital signal is provided on line 47 by the sensor 46 to electronic controller 30 to indicate the sensed position of pedal 42.

The manual clutch engagement control 26 is optional. It provides a means for the operator to manually control the clutch engagements in a manner similar to that in a conventional vehicle wherein the clutch pedal is mechanically linked to the transmission. Control 26 permits the operator to feather the clutch and to disengage the engine from the transmission and drive shaft. Sensor 46 senses whenever the clutch pedal 42 is depressed from its normal top position, and begins to feather the clutch by reducing the hydraulic pressure applied to the currently selected directional clutch. the reduction in hydraulic pressure is proportional to the relative position of the clutch pedal 42 as sensed by clutch potentiometer 44 and reflected in the analog value of signal 45. In addition, whenever the clutch pedal 42 is fully depressed, it actuates normally closed switch 26 located very near the end of the bottom of travel of the pedal 42, thus breaking the supply of power from the +12 volt supply line 23 to solenoid valves 22a–22f. One benefit of the manual clutch engagement control 26 is that the driver of a vehicle (for example, an agricultural tractor pulling a ground-engaging draft implement) in the field and is pulling a plow or can, upon observing an obstacle, stop his vehicle and then proceed to inch around the obstacle at a very slow rate of speed in the first forward gear (or first reverse gear) by use of the clutch pedal 42.

In the preferred embodiments of the present invention, the controller 30 also supplies output signals to a display 50, which may be a multiple character liquid crystal display (LCD). Display 50 may be used to provide visual information to the operator, such as the present gear selected by the controller 30, the mode (forward, neutral or reverse) selected by the operator, or other information as will be later explained. In the absence of more urgent information, the display 50 always indicates to the driver the speed gear which is currently engaged within transmission 20, and the directional gear (if any) which is currently engaged.

The operation of the drive system of FIG. 1 from an operator's is viewpoint is generally as follows. The engine 14 is started when mode select lever 35 in its neutral (N) position. Neutral safety start switch 28 disconnects power to the directional solenoid valves 22 and provides power to the starter circuit. Transmission 20, therefore, is in neutral. Assuming the driver has not yet moved the pulser lever 37, the controller 30 will default to first gear as the selected gear, and engage the first speed gear clutch. As previously explained, engaging a speed gear clutch without engaging a directional clutch does not take the transmission out of neutral.

When the driver moves the mode select lever 35 from N to F, controller 30 actuates the appropriate solenoid valve 22 to engage the forward directional clutch to place transmission 20 into the first forward gear. As will be explained, the controller 30 automatically provides for a controlled gradual engagement of the selected directional clutch for the smooth shifting from neutral to first gear without lurching or other objectionable shocks or torque spikes being present. If desired, the operator can use clutch pedal 42 to manually modulate the transmission 20, so as to feather the drive. However, this is not necessary unless a slower than normal clutch engagement for the gear which has been selected is desired.

Gears higher than the first forward gear are obtained by moving the pulser lever 37 to its UP position. One movement of the pulse lever 37 to up-shift position provides a single upshift pulse. Pulsing the pulser lever 37 rearward to its DN position gives the reverse effect. Each downshift pulse provided to controller 30 causes the controller to change the particular solenoid valves which are actuated to produce the desired downshifting of the transmission 20. Controller 30 does not permit downshifting from first forward gear to either neutral or reverse by means of the pulser lever 37. Similarly, it does not permit shifting from first (or any other) reverse gear to neutral or a forward gear by means of pulser lever 37. Such shifts can be achieved only by use of the mode select lever 35.

When the mode lever 35 has been in its N position and then is laced in the R position, controller 30 actuates the proper solenoids 22a–22f to provide first reverse gear. Higher reverse gears, that is reverse gears with a higher gear ratio than the first reverse gear, are normally obtained by pulsing lever 37 from its normal position to its UP position, as is done in the forward mode.

If desired, controller 30 may be programmed so as to allow gears above the first forward gear or below the first reverse gear to be modulated by the clutch pedal 42. However, for the preferred embodiment of transmission 20, it is presently preferred to only allow first gear forward or reverse to be so modulated. Depressing clutch pedal 42 causes clutch position sensor 46 to provide a signal to controller 30. In the preferred embodiment, if the transmission 20 is not in first forward or reverse gear, controller 30 preferably immediately de-energizes all solenoid valves 22a–22f, to cause transmission 20 to be shifted to neutral.

In the preferred embodiment, the electronic controller 30 allows the transmission 20 to be shifted from neutral to any gear previously selected by use of the pusher lever 37. For example, if the operator wishes to go from neutral to second gear, he need only actuate the pulser lever 37 until display 50 indicates that the second speed gear has been selected. Then, he may shift the mode lever 35 from N to either F or R to put the transmission 20 into the second forward gear or second reverse gear respectively. This gear-skipping feature, which may be referred to as skip-shifting, allows the operator of a lightly loaded vehicle to avoid unnecessary upshifting or downshifting to place transmission 20 into any gear he desires from neutral. As will be later explained in detail, the electronic controller 30 provides for adjustment of hydraulic parameters which, for a lightly loaded vehicle, will permit transmission 20 to shift smoothly from neutral to a higher gear in either forward or reverse.

A feature related to skip-shifting is shuttle-shifting, which is the deliberate shifting by the operator from a current higher forward gear to a pre-selected higher reverse gear, and vice-versa, without requiring the operator to manually place the transmission in netural. Thus, if an operator on a front-end loader wishes to go directly from second gear reverse to second gear forward, and back again (such as might be done repetitively when performing a repetitive loading operation), the electronic controller 30 can readily be arranged to allow such direct shifting. In a preferred embodiment of the present invention, to shuttle-shift the operator need not touch the pulser lever 37, but only need move the mode lever 35 from F to R (or vice versa). Controller 30 does not expressly recognize the intent of the operator to perform a shuttle shift. However, when the operator shifts the mode lever 35 from F to R (or vice versa) without upshifting or downshifting while lever 35 is in its N position, controller 30 selects the speed gear to engaged according to the shuttle-shift combination associated with the most recently engaged gear of the opposite direction.

Figure 2:
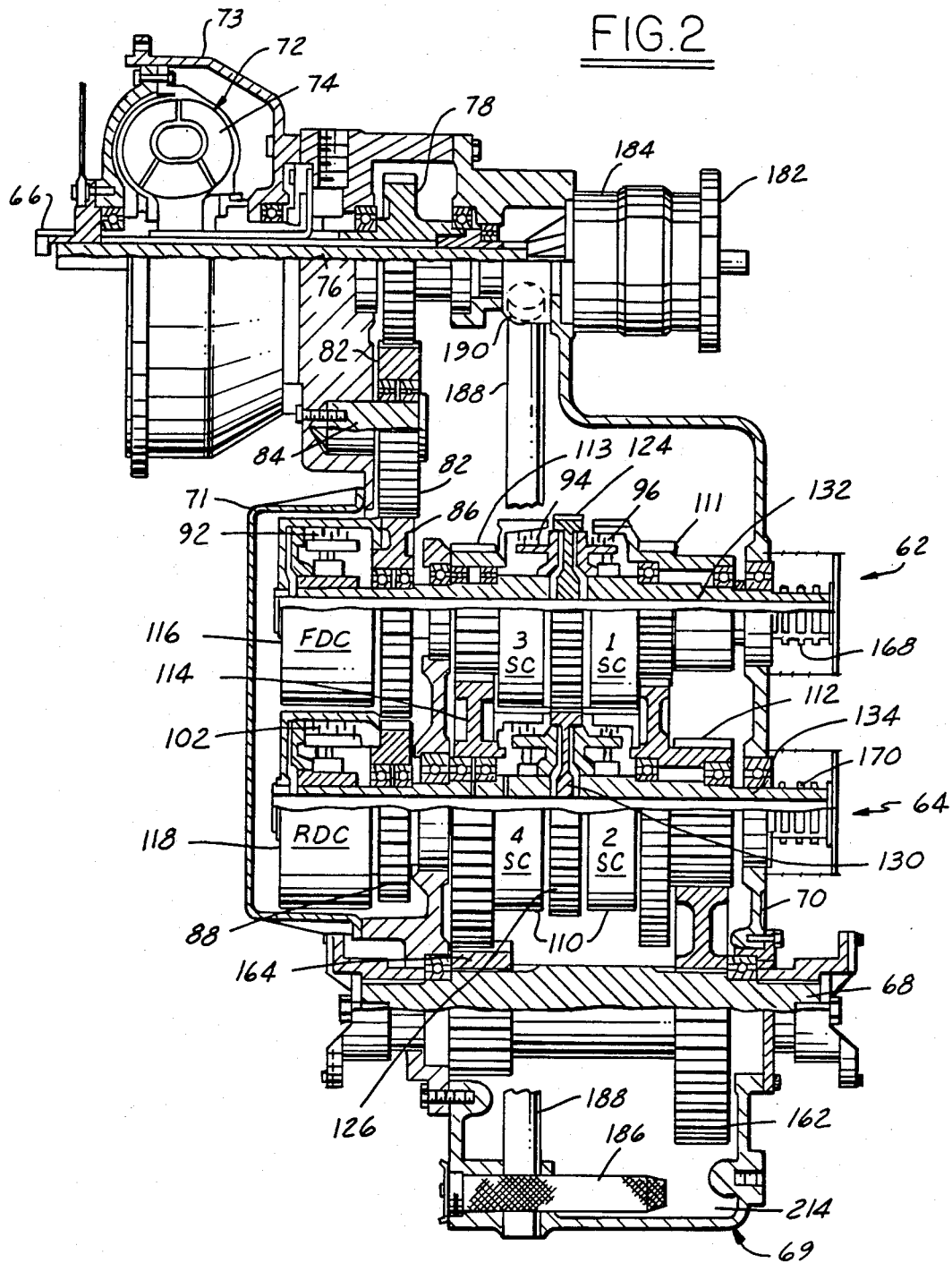
FIG. 2 is a side elevational view shown in partial cross-section of a powershift transmission controlled by the electronic control system of the present invention.

Transmission 20 (FIGS. 2 through 4)

FIG. 2 is a detailed side elevational view of a preferred embodiment of transmission 20 of FIG. 1 selectively cut away in partial cross-section to beter show its internal construction. Also, for illustration purposes, the first and second stages of transmission 20 are shown arranged vertically to one another, when in fact, they are actually at the same horizontal elevation within transmission 20. This embodiment of transmission 20 was very recently developed by the Funk Manufacturing Division of Cooper Industries, Inc. in Coffeyville, Kans. The particular transmission described is known as the Funk 5000 Series transmission. The mechanical, hydraulic and operational features of a Funk 5000 Series transmission are described in detail in J. Goodbar and M. Testerman, "The Design and Development of a Four Speed Powershift Transmission With Electronic Clutch Pressure Modulation," SAE Technical Paper No. 861212. Proceedings of the Off-Highway and Power Plant Congress and Exposition, held in Milwaukee, Wis. on Sept. 8-11, 1986, which is hereby incorporated by reference. Among other things, this technical paper described a number of the advantages achieved by using a pulse width-modulated solenoid-operated proportional valve achieve hydraulic pressure modulation and torque load characteristics which are tailorable to specific vehicle application requirements so as to provide relatively soft, optimized engagements of forward and reverse direction clutches. We developed the electronic control system of the present invention under the auspices of the assignee of the present invention in part to electronically control and operate the Funk 5000 Series transmission. In so doing we provided the electronic means by which the shifting and performance of Funk's new transmission could be controlled and optimized in all gears and environmental conditions.

The transmission 20 features a gear train, which includes first and second stages 62 and 64 having three clutches each, interconnecting an input shaft 66 and output shaft 68 through these clutches and various gears which will shortly be described. The shafts, gears and other components of the transmission are mounted to and enclosed within a suitably sturdy housing assembly 69 provided with various removable housings such as the main or rear housing 70 and front cover housing 71. The input shaft 66 is connected to the impeller 75 of an SAE torque converter 72 located within bell housing 73. The turbine 74 is connected to the driven turbine shaft 76 of converter 72 upon which is rigidly positioned a turbine gear 78, that serves as the input gear for the main portion of transmission 20. An idler gear 82 rotatably mounted on shaft 84 is positioned between turbine gear 78 and forward and reverse hub gears 86 and 88. The three clutches of the first stage 62 consist of forward directional clutch FDC and first and third speed clutches 1SC and 3SC. Clutch packs 92, 94 and 96 respectively are found therein. The three clutches of the second stage 64 consist of reverse directional clutch RDC and second and fourth speed clutches 2SC and 4SC, which have clutch packs 102, 104 and 106 respectively located therein. In FIGS. 2 and 3, the clutch packs are shown in schematic form to avoid unnecessarily cluttering the Figures. The gear ratios for both the forward and reverse directions are identical, namely: 4.167; 2.285; 1.178; and 0.589.

Identical clutch hubs 110 are welded to the first, second, third and fourth range hub gears 111, 112, 113, and 114. The clutch hubs 116 and 118 of the forward and reverse hub gears 86 and 88 are identical to one another and longer than the speed clutch hubs 110. First and second stage cylinder gears 124 and 126 are also identical. The forward hub gear 86 is identical to the reverse hub gear 88. Identical cylinders are used on the speed clutches 1SC, 2SC, 3SC and 4SC. The cylinders on the directional clutches FDC and RDC are also identical to one another.

The speed clutch cylinders 127 and 128 are welded to center support webs such as webs 129 and 130 that are welded to the main shafts 132 and 134 of first and second stages 62 and 64 respectively. FIG. 3 show a cross-sectional view of one of the stage shafts and its associated clutches, namely shaft 132 of the first stage 62, to illustrate these details more clearly. The center support webs such as web 127 supports the integral cylinder gears as well as providing the sealing surface bore for the outer seal on the clutch apply pistons such as pistons 133 and 135. The directional clutch cylinders are removable and mount on splines that have been machined on the main shafts 132 and 134. When the internal splines are broached on the cylinders, one tooth is removed every 60°. This space is utilized to drill holes to allow cooling fluid to exit from the clutch packs and return to the transmission sump.

As shown best in FIG. 3, gun-drilled axial hole 137 provides cooling fluid to the clutch packs and various bearings used within the transmission 20. The other gun-drilled holes 138, 139 and 140 which are gun-drilled parallel and to spaced from the hole 134 supply pressurized charge fluid to the three hydraulically actuated clutches FDC, 1SC and 3SC mounted on the shaft 132. As best shown in FIG. 3, clutch piston return springs, such as belleville-type springs 142 and 144 respectively associated with the forward directional clutch 92 and the third speed clutch 96, are provided to return the apply pistons of these clutches to their disengaged state in the absence of sufficient hydraulic pressure bearing against the apply pistons to overcome the springs.

As illustrated in FIG. 2, on output shaft 68 of transmission 20 are keyed or pinned a first and second range output gear 162 and a third and fourth range output gear 164. Output gear 162 is meshingly engaged by second range hub gear 112 rotatably mounted upon second stage shaft 134. Hub gear 112 is one-half of a compound gear 166, the other half being gear 168, which meshes with first range hub gear 111. The third and fourth range output gear 164 is engaged by fourth range hub gear 114 rotatably mounted upon second stage shaft 134. Gear 114 is, in turn, meshingly engaged by third range hub gear 113 rotatably mounted upon first stage shaft 132.

First and second stages 62 and 64 of transmission 20 are each provided with rotary hydraulic couplings 168 and 170 to enable hydraulic connections to be made to rotating shafts 132 and 134. Transmission 20 includes an auxiliary power take-off (PTO) unit 182 and transmission charge pump 164 coupled to turbine shaft 76 of torque converter 72. The hydraulic pump 184 obtains hydraulic fluid from the bottom of the main housing 70 through a removable tubular suction screen or strainer 186 that connected by suction line 188 to the pump inlet 190. As may be appreciated from the radially-arranged holes 194 connected to axial hole 137 in shaft 132 as shown in FIG. 3, the hydraulic pump 184 provides cooling fluid which flows through the clutch packs and lubricates the bearings. The pressurized transmission oil is also used to operate the six clutches of transmission 20 in a manner which will shortly be further explained.

The operation of the gear train of transmission 20 may be understood with the aid of the simplified headset gear diagram shown in FIG. 4. When turbine gear 78 rotates in a clockwise direction as shown by arrow 176, idler gear 84 rotates in a counterclockwise direction as shown by arrow 177, causing forward and reverse hub gears 86 and 88 to rotate in a clockwise direction as shown by arrows 178 and 179. When any forward gear is desired, forward directional clutch FDC is engaged by supplying hydraulic fluid through gun-drilled hole 138 leading to its clutch pack 92, causing the clutch apply piston therein to move and forcing the clutch plates of the clutch pack to frictionally engage. In the first forward gear, first cylinder gear 111 is caused to rotate in a clockwise direction by the engagement of its clutch pack 94, which in turn causes second range hub gear to rotate in free-wheel fashion in a counterclockwise direction, and output gear 162 to rotate in clockwise direction, thus turning output shaft 68 clockwise. In second forward gear, first cylinder gear 124 rotates in clockwise direction, causing second cylinder gear 126 to rotate in a counterclockwise direction. Second gear speed clutch 2SC is engaged, which causes second cylinder gear 126 and second range hub gear 112 connected thereto to rotate in a counterclockwise direction, thus rotating output gear 162 and output shaft 86 in a clockwise direction. To engage the third forward gear, the third gear speed clutch 3SC is engaged, causing third range hub gear 113 to rotate in a clockwise direction, which causes fourth range hub gear 114 to freewheel in a counterclockwise direction on shaft 134, and rotate output gear 164 and output shaft 68 in a clockwise direction. To engage fourth forward gear, fourth speed gear clutch 4SC is applied, locking fourth cylinder gear 114 to cylinder gear 126 which is rotating in counterclockwise direction on account of its meshing engagement with first stage cylinder gear 124, causing fourth range hub gear 114 to drive output gear 164 and output shaft 68 in a clockwise direction.

The operation of the four reverse gears may be readily explained in a similar manner that should be obvious to those skilled in the art from inspection of FIG. 2. Briefly, when in the reverse mode, the reverse directional clutch RDC is engaged, locking the reverse clutch hub 118 and reverse hub gear 82 to second stage shaft 134 so that it is powered by idler gear 84 and running in a clockwise direction. In second and fourth reverse gears, power is provided directly from shaft 134 to the output gear 162 or 164 on output shaft 168 by respective engagement of second speed gear clutch 2SC or fourth speed gear clutch 4SC. Cylinder gear 126 welded to shaft 134 causes the cylinder gear 124 welded to shaft 132 of first stage 62 to rotate in a counterclockwise direction. This enables first and third speed gear clutches 1SC and 3SC when engaged to cause their respective hub gears 111 and 113 to rotate in a counterclockwise direction and to transmit power through then free-wheeling hub gears 112 and 114 on the second stage shaft 134 to the output gears 162 and 164 of output shaft 68.

Figure 5:
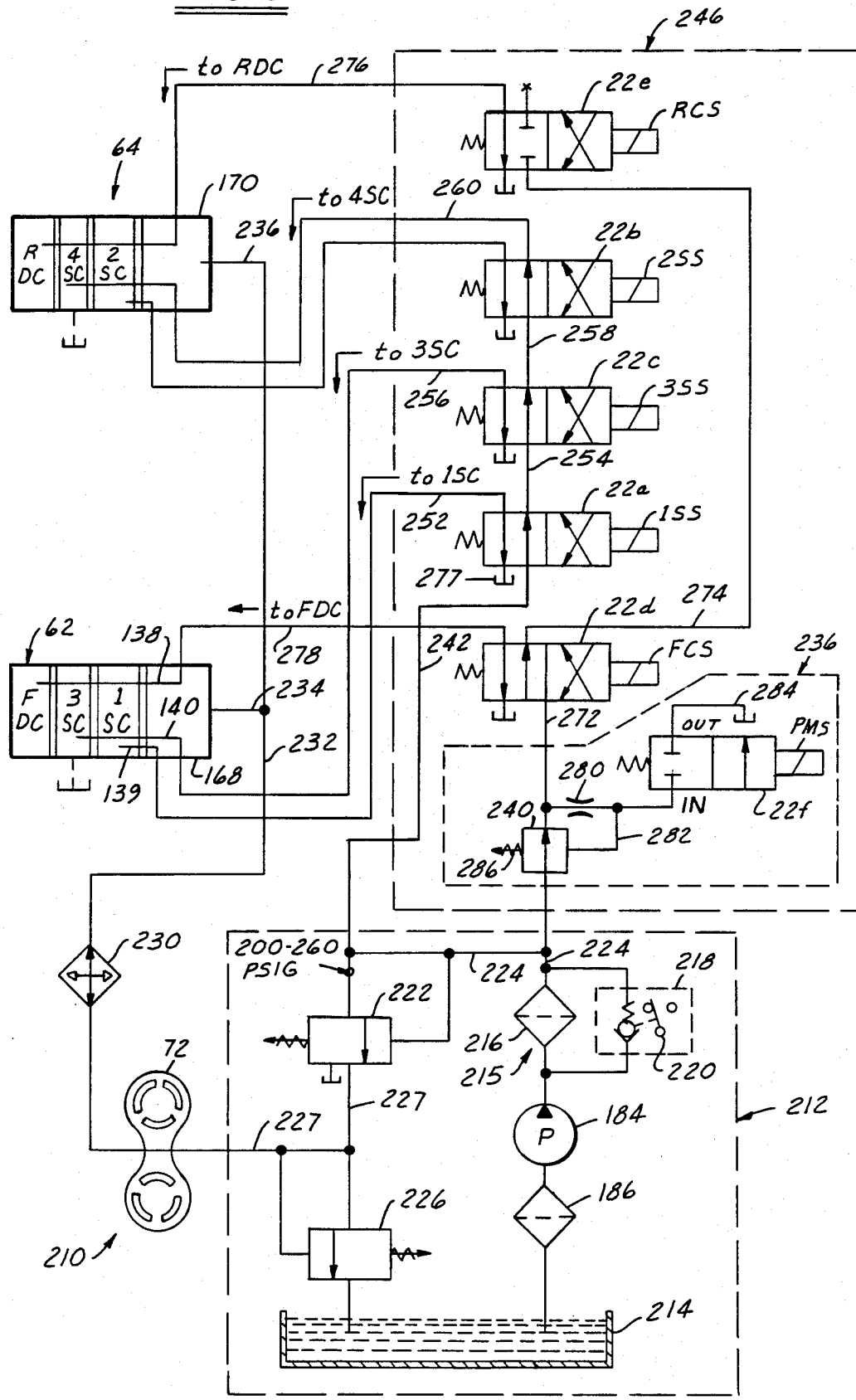
FIG. 5 is a hydraulic diagram for the FIG. 2 transmission.

Hydraulic System (FIGS. 5 through 7)

FIG. 5 through 7 relate to the hydraulic system 210 used to control the engagement and lock-up of the clutches of transmission 20. The hydraulic system 20 is shown with conventional hydraulic symbols in schematic form in FIG. 5. The hydraulic power supply section 212 of the hydraulic system 210 includes: a hydraulic reservoir or sump 214 (which is the bottom interior chamber of the transmission housing assembly 69 shown in FIG. 2); the strainer 186; the hydraulic pump 184; a high pressure filter assembly 215 with a ten micron filter 216 having a spring-loaded bypass check valve 218 provided with an electrical switch 220 to indicate when filter 216 is being bypassed; and a main or system pressure relief valve 222. The relief valve 22 is the main pressure regulator for the hydraulic system and is connected to high-pressure output conduit or hydrauilc line 224. The power supply 212 also includes a second pressure relief valve 226 to ensure that the back-pressure of the hydraulic oil dumped over main relief valve 222 into discharge line 227 does not overpressurize the torque converter 72. The discharge flow from relief valve 222 enters the torque converter 72 and is then passed through a transmission heat exchanger 230. This cooled flow is then directed to the transmission bearings and clutch packs via hydraulic feed lines 232, 234 and 236. Line 234 feeds the axial hole 137 via the rotary coupling 168 on shaft 132 of first stage 62, while the line 236 feeds a similar axial hole via the rotary coupling 170 on shaft 134 of output stage 64.

The high-pressure fluid in main line 224 from the hydraulic power supply 212 is routed to the directional clutches FDC and RDC through a clutch pressure modulation circuit 238 within the dot-dash line which includes a pressure reducing valve 24 which acts as a second hydraulic pressure regulator. The pressurized fluid from line 224 is also directed to the speed clutch valves 22a–22c via feed line 242 without first passing through the reducing valve 240. The purpose for this particular routing of pressurized hydraulic fluid is to allow the speed clutches 1SC–4SC to engage and synchronize before modulation and synchronization of the directional clutches FDC and RDC occur. In other words, the intent is have the major portion of the clutch energy be absorbed by the directional clutches and not the speed clutches during any clutch engagement.

Also, the hydraulic valve circuit 246 (surrounded by dashed lines) is arranged to prevent any two of the speed clutches or any two of the directional clutches from being engaged at the same time. This is achieved by a series path design for both the directional and speed clutch fluid supply circuit.

The hydraulic valve circuit 246 includes the six solenoid-operated hydraulic valves 22a through 22f. Each of these solenoid-operated valves is a conventional, single-solenoid, two-position, spring-returned valve. Valves 22a through 22e are shown as four-way valves intended for on-off or "bang-bang" operation, while valve 22f is a two-way valve intended for operation as a proportional value having an adjustable orifice between its inlet port and output port. When solenoid 1SS of valve 22a is energized, it shifts the valve spool within valve 22a, causing hydraulic line 242 to be placed in fluid communication with line 252, thereby providing hydraulic fluid to the first speed clutch 1SC located on stage 62. When solenoid 3SS of valve 22c is energized pressurized hydraulic fluid in line 254 is directed to line 256, which in fluid communication with the third speed clutch 3SC located on the first stage 62. Note that solenoid 1SS must be deenergized in order for the third speed clutch 3SC to be actuated. When solenoids 1SS, 2SS and 3SS are deenergized, pressurized fluid flowing serially through lines 242, 254 and 258 is supplied to line 260 which is in fluid communication with the fourth speed clutch 4SC located on the second stage 64. If solenoid 2SS is thereafter energized, the pressurized fluid from line 258 is directed toward line 262 for delivery to and actuation of the second speed clutch 2SC.

Hydraulic fluid to engage the forward directional clutch FDC and the reverse directional clutch FDC is provided from main line 224 through pressure regulator 240. When solenoid RCS of valve 22d is deenergized, the hydraulic fluid in line 272 downstream from regulator 240 is routed to hydraulic feed line 274, which leads to valve 22e. If solenoid RCS of valve 22e is deenergized, the fluid in line 274 is blocked by plugged port 275 of valve 223 and does not pressurize or flow to the reverse directional clutch RDC. When solenoid RCS of valve 22e is energized, thereby shifting the valve spool of valve 22e, pressurized fluid from line 274 is directed to line 276, which is in fluid communication with the reverse directional clutch RDC, thereby applying clutch RDC. When solenoid FCS of valve 22d is energized, valve 22d actuates, connecting line 274 to the tank, that is, to the reservoir or sump 214 through drain line 277, thus completely depressurizing line 274. Thus, the reverse directional clutch RDC is disengaged, even if solenoid RCS were still energized (which it should not be). Energizing solenoid FCS also causes valve 22d to direct the pressurized fluid in line 272 to line 278 in fluid communication with the forward directional clutch FDC, thus applying clutch FDC.

Each of the solenoid-operated valves 22a–22f has a drain line like drain line 277. Each of the six clutches in transmission 20 is in fluid communication through one of these drain lines with the sump 214 whenever not selected for engagement by energization and actuation of the appropriate solenoid and its associated valve 22. This hydraulic design results in the clutches quickly disengaging whenever they are no longer selected for actuation. Note that when none of the first three speed clutches 1SC, 2SC and 3SC are selected for actuation by energization of solenoids 1SS, 2SS or 3SS, then, by default, the fourth speed clutch is automatically selected by the hydraulic valve circuit 246 for engagement.

FIG. 6 is a truth table which shows which solenoid or solenoid pair must be energized in order to put the transmission 20 into the first reverse gear (REV1) through fourth reverse gear (REV4), and into the first forward gear (FWD1) through fourth forward gear (FWD4). As can be determined by studying FIGS. 2 and 5, gears 1 through 3 can only be obtained by energizing two solenoids, namely the appropriate speed solenoid and the desired directional solenoid. Gear REV4 can be obtained by energizing only solenoid RCS, and gear FWD4 can be obtained by energizing only solenoid FCS.

The aspects of the hydraulic system 210 which enable the hydraulic pressure supplied to the forward and reverse directional clutches FDC and RDC to be modulated in order to provide for smooth, jolt-free gradual engagement of these clutches during gear shifts will now be explained. The clutch pressure modulation circuit 236 includes pressure reducing valve 240, proportional solenoid valve 22f, and fixed orifice 280 interconnected as shown in FIG. 5. The pilot line 282 of pressure reducing valve 240 is located on the downstream side of fixed orifice 280, and is connected to the inlet (IN) port of control valve 22f. Valve 22f is a normally closed, proportional hydraulic valve which is operated by solenoid PMS. Solenoid PMS is energized with a proportional signal from electronic controller 30 which can vary in average magnitude from 0% to 100%, which varies the size of the opening between the input port and output (OUT) port of valve 22f from 0% (no flow or shut condition) to 100% (maximum size orifice or full flow condition). Valve 22f provides a selectable, controllable size orifice between pilot line and return line 284 which leads directly to hydraulic reservoir 214 as indicated. The size of valve 22f and its opening is selected relative to the size of fixed orifice 280 so that, full or 100% energization of solenoid PMS provides a sufficiently large opening between pilot line 282 and return line 284 to cause the fluid pressure in pilot line 282 to drop so low that return spring 286 of pressure regulator 240 substantially completely closes off fluid flow from high pressure line 224 to line 272. Note that in this condition, orifice 280 provides a bleed-off for any existing pressure in line 272, which will promptly drop pressure in all lines and clutches then in fluid communication with line 272 through valve 22d and valve 22e. When the solenoid PMS is only partially energized, such as 50%, the size of the opening through valve 22f available to drain pilot line 282 is insufficient to allow the fluid pressure to drop enough to cause pressure reducing valve 240 to close completely, since some pressure still exists in line 282 and resists the force of opposing bias spring 286. Accordingly, some fluid is still able flow through reducing valve 240 and a controlled amount of pressure is maintained in hydraulic line 272 for regulating engagement of the forward or reverse directional clutch FDC or RDC.

The opening or orifice or a proportional solenoid valve 22f is variable depending upon the position of its valve spool or solenoid plunger, which is controlled by the electromagnetic field generated by the average DC voltage supplied to the proportional solenoid. The voltage signal applied to solenoid PMS is preferably an alternating electrical signal, such as a pulse width modulated (PWM) signal having an average DC value directly correlated to its duty cycle. Fixed orifice 280 is sized to restrict the amount of fluid which may flow from hydraulic line 272 into the pilot line 282, thereby permitting the variable size opening in valve 22f to control the pressure in line 282 and thereby control the pressure in main line 272 downstream from reducing valve 240.

FIG. 7 is a simplified plan view showing the six solenoid valves 22a–22f and pressure reducing valve 240 mounted on top of a hydraulic manifold 300 in close proximity to one another. In particular, the solenoids, such as solenoid FCS and PMS, are in relatively close proximity, thus permitting magnetic coupling to occur between the solenoid valves when energized. In conventional powershift transmissions, the arrangement of solenoids in close proximity to one another is not known to pose any problem. We have learned that in powershift transmission 20, magnetic coupling between the solenoid FCS and the proportional modulation solenoid PMS adversely effects the desired operation of the proportional modulation valve 22f. For this reason, it is highly desirable to provide magnetic flux compensation to counteract the effect of the undesired magnetic coupling between the solenoid FCS and solenoid PMS, which will be further discussed later.

Controller 30 and Its Electrical Circuits (FIGS. 8 through 13)

Figure 8:
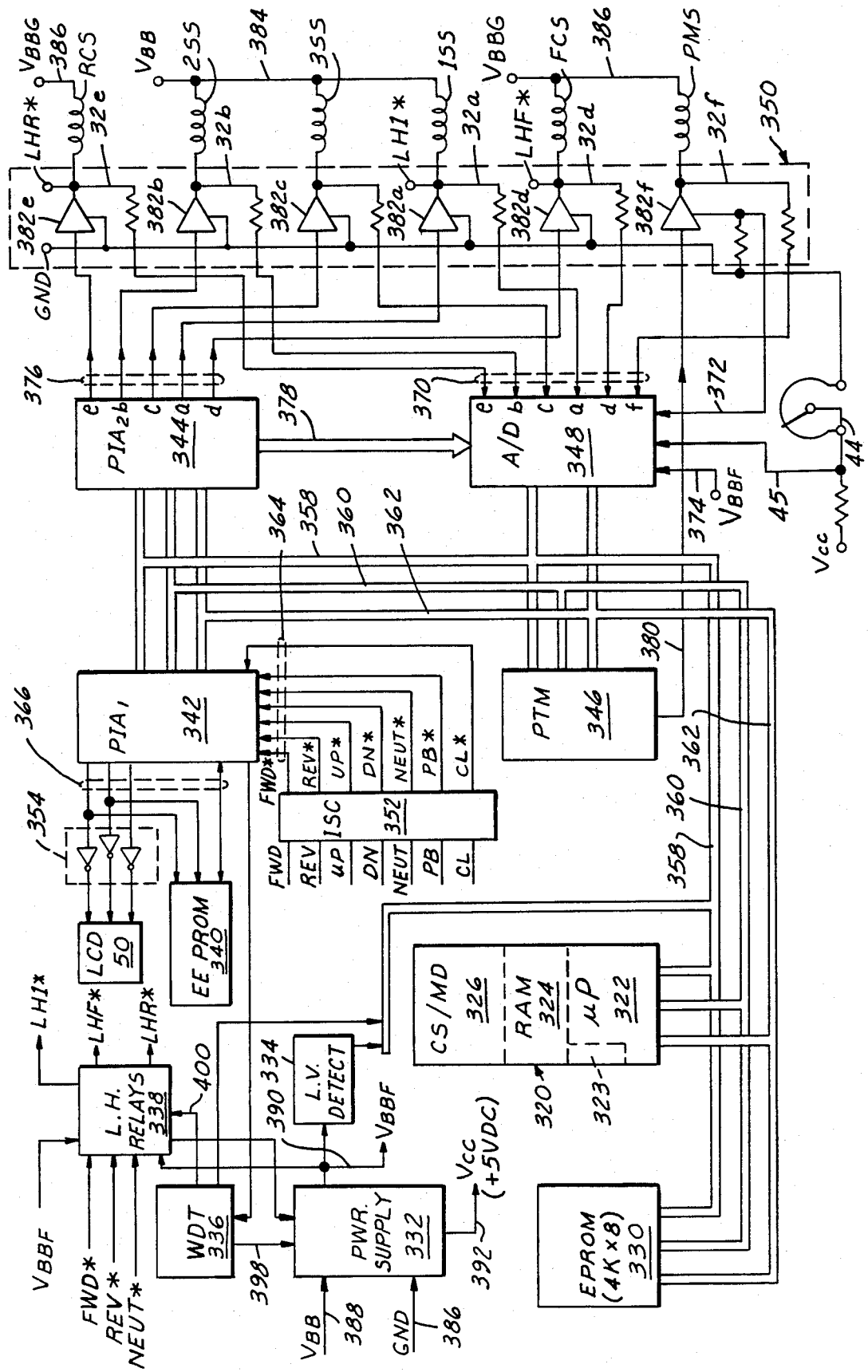
FIG. 8 is a detailed block diagram showing the components of the FIG. 1 electronic control system, including circuit details of the output section providing electrical signals to the transmission solenoids.

FIG. 8 is a block diagram of electronic controller 30 of FIG. 1. Controller 30 includes microcomputer 320 which is comprised of a microprocessor 322 with crystal oscillator time base 323, random access memory (RAM) 324, and a chip select/memory decode (CS/MD) circuit 326. Controller 30 also includes: a U-V erasable, programmable read-only memory (EPROM) 330; a power supply circuit 332; a low voltage detector circuit 334; a watchdog timer circuit 336; a limp-home relay circuit 338; a nonvolatile read/write (R/W) memory 340 in the form of an electrically erasable, programmable read-only memory (EEPROM); first and second buffered input/output (I/O) port circuits 342 and 344 which may take the form of a Peripheral Interface Adapter (PIA); a programmable time module (PTM) 346; an analog-to-digital (A/D) converter circuit 348; a transmission solenoid driver circuit 350; an input signal conditioner circuit 352; and a display driver circuit 354.

Microprocessor 322 communicates with the remainder of the circuits and modules through multiple-line control bus 358, multiple-line address bus 360 and multiple-line data bus 362, which are connected as shown. Input conditioner 352 receives input signals FWD, NEUT and REV from the mode select control 34, receives UP and DN input signals from pulser select control 36, receives input signal PB from parking brake control 27, and receives input signal CL from the manual clutch engagement control 26. These signals are transformed by conditioning circuit 352 into negative true digital logic signal FWD*, REV*, UP*, DN*, NEUT*, PB*, and CL* for delivery to first I/O port 342 through lines 364, as shown. I/O port 342 controls and communicates with display driver circuit 354 through control lines 366. In addition, port 342 communicates serially with and controls nonvolatile R/W module 340 via control lines 366.

Potentiometer 44 provides an analog input signal representing the position of the clutch pedal 42 on line 45. A/D converter 348 is a sixteen-channel analog-to-digital input device. It receives the signal on line 45 as an analog input. Converter 348 also receives analog input signals from feedback lines 370 from the transmission solenoid driver circuit 350 and from feedback line 372 from the driver circuit for solenoid PMS. Converter 348 also receives the filtered supply voltage signal $V_{BBF}$ as an analog input from line 374. Each of these analog input signals is connected by a distinct input pin leading to a distinct channel of A/D converter 348.

The second I/O port 344 provides digital output signals to five output lines 376 which lead to the inputs of five individual solenoid drivers of circuit 350. Module 344 also outputs control signals for the channel selection of A/D converter 348 via multiple control lines 378.

The sixth solenoid, namely the proportional solenoid PMS, is driven by a proportional alternating signal, such as pulse width modulation (PWM) signal from programmable timer module 346 that is output on line 380. In the preferred embodiment, the PWM signal on line 380 from programmable timer module 346 has a constant frequency of 200 Hz when present, generated within module 346 from a 0.9 MHz clock signal received from microprocessor 322 via one of the control lines of control bus 358. The value of the duty cycle of the PWM signal is adjusted or updated every 10 milliseconds. The accuracy with which the duty cycle may be set or adjusted is dependent upon the frequency of the 0.9 MHz clock signal. The duty cycle of the PWM signal may be varied by adjusting the on-time (i.e., the mark-time of the mark-to-space ratio) of the PWM signal from 0.0000% to 99.99998% in increments of 1.1 microseconds (i.e., the period of the above clock signal) as determined by the value of the lower order bits loaded in a sixteen-bit register within PTM 346 by microprocessor 322.

The microprocessor 322 in a conventional manner periodically interrogates all of the inputs to determine their status, and periodically updates all outputs. This communication function occurs over buses 358 through 362. Selected inputs, such as UP* and DN*, are connected by lines 364 to the input/output port 342 in a conventional manner which allows an interrupt signal (IRQ) to the microprocessor 322 via an interrupt line which is part of control bus 358. These interrupts are generated by port 342 upon change of state of any of the lines 364 from high to low.

As noted above, transmission solenoid driver circuit 350 receives five signals from the second input/output port 344 and one signal from the programmable timer module 346. Each of these output signals are connected to one of the individual driver/amplifiers 382a–382f. The preferred embodiment of controller 30, the individual driver output lines 32a–32f must be grounded to energizer their respective solenoid coil, since the other side of each of the solenoid coils is connected to one of two supply lines 384 or 386 coming from a source of DC supply voltage, as will be further explained.

The transmission solenoid driver circuit 350 provides feedback signals on lines 370 to A/D converter 348 which are digitized and then delivered to the microprocessor 320. Using this feedback information, microprocessor 320 can determined whether the individual solenoids 21 and their associated transmission solenoid driver circuits are functioning properly. Specifically, microprocessore 320 can interrogate the five individual solenoid driver circuits 350a–350e by supplying appropriate address and command signals to I/O port 344 and with A/D converter 348, monitor the analog feedback signals on lines 370. Microprocessor 322 can interrogate the solenoid driver circuit 350f for solenoid PMS by sending similar address and command signals to programmable timer module 346 which drives circuit 350f. However, it is still A/D converter 348 which digitizes the analog signals on line 370f and 372, and digitizes them for delivery via data bus 362 to microprocessor 322 for analysis.

The power supply circuit 338 receives a supply voltage $V_{BB}$ applied across ground line 386 and line 388, and produces a coarsely filtered supply voltage $V_{BBF}$ to low voltage detector circuit 334. The power supply 332 also produces a heavily regulated $V_{CC}$ signal (nominally +5 volts DC) on line 392 which supplies power to all of the circuits or modules 334–354.

Low voltage detector circuit 334 monitors the supply voltage $V_{BBF}$ on line 390 and signals microprocessor 320 by a signal placed upon control bus 358 whenever a low voltage condition is detected, so that appropriate action may be taken, preferaby resetting microprocessor 322. Watchdog timer circuit 336 monitors proper operation of the software in a manner well-known to those in the art, namely providing an I/O output command placed at regular intervals within all portions of the stored program to reset the timers within circuit 336. Circuit 336 includes two timers which must be reset before the expiration of a predetermined interval, such as 20 milliseconds, by a control signal delivered by line 394 from first I/O port 342. If either one of the timers within circuit 346 times out on account of failure to receive a timer reset signal on line 394 before the end of the predetermined interval, a signal on line 396 resets the microprocessor. If watchdog timer circuit 336 fails to receive a reset signal on line 394 for an even longer time interval, such as 320 milliseconds, circuit 336 generates a signal on line 398 which causes the power supply 332 to cut-off power to the microcomputer 320 by activating line 400 to energize the limp home circuit 338.

Limp home circuit 338 contains several relays which are responsive signals FWD* and REV* derived from the forward and reverse signals from mode select control 34 which enable the energization of the forward and reverse solenoids FCS and RCS and first gear speed clutch solenoid 1SS, but only after mode lever 35 has been placed in its N position and then shifted to its F or R position. Limp home relay circuit 338 bypasses the disabled microcomputer 320 by directly actuating the appropriate solenoids via grounding signals limp home first gear (LH1*), limp home forward (LHF*), and limp home reverse (LHR*) respectively connected to the driver/amplifier outputs 32a, 32d and 32e.

Integrated circuits suitable for use in the electronic controller 30 are listed in Table 3 below:

TABLE 3

| REF. NO. | ITEM | MANUFACTURER | PART NO. |
| --- | --- | --- | --- |
| 322 | Microprocessor | Motorola | MC6802 |
| 324 | RAM | Motorola | MC6802 |
| 326 | CS/MD | National Semiconductor | 74HC138 |
| 330 | EPROM | Motorola | MCM2532 |
| 340 | EEPROM | National Semiconductor | NMC9306 |
| 342 | PIA$_1$ | Motorola | MC6821 |
| 344 | PIA$_2$ | Motorola | MC6821 |
| 346 | P.T. Module | Motorola | MC6840 |
| 348 | A/D Converter | National Semiconductor | ADC0817 |

The peripheral interface adapters (PIA) are integrated circuit chips (ICs) used for I/O port 342 and 344 are configured by instructions received from microprocessor 322 when electronic controller 30 is initially started up in a manner well known to those familiar with the Motorola 6800 Series ICs. The software program used to provide this initialization of the I/O ports 342 and 344, as well as the internal operation of electronic controller 30, and the operation of transmission 20 as determined by electronic controller 30 is stored in the ROM chip 330. The techniques used to program the Motorola 6800 Series microprocessor and related chips are well understood, and need not be described here, beyond describing the novel functions implemented by controller 30 which are described more fully below.

Figure 9:
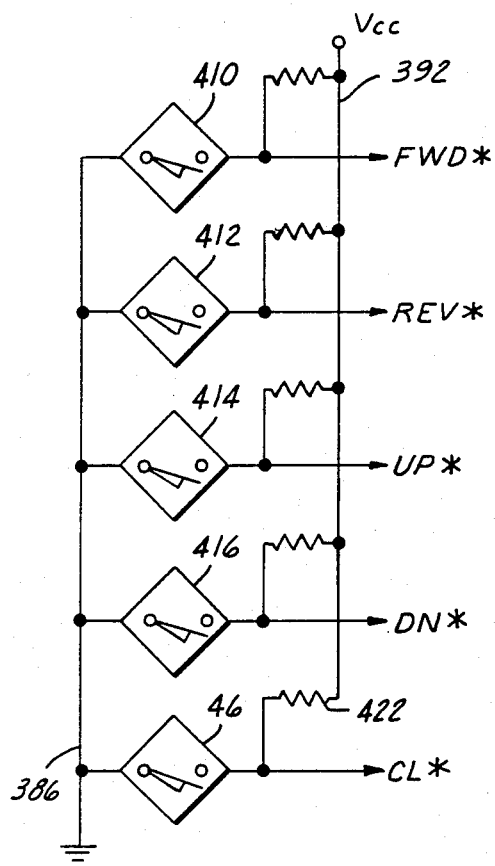
FIG. 9 is a schematic diagram showing five proximity switches which provide input signals to the FIG. 8 electronic control system.
Figure 10:
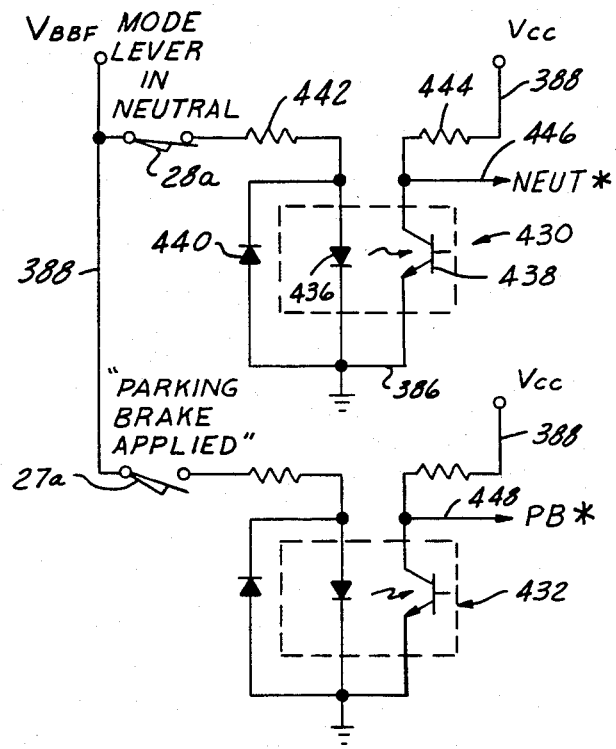
FIG. 10 is a schematic diagram of opto-isolator input circuits for two input signals for the FIG. 8 control system.

FIGS. 9 and 10 show a preferred embodiment of input signal conditioner circuit 352. In FIG. 9, five proximity switches 410–416 and 46 are shown which respectively produce the signals FWD*, REV*, UP*, DN* and CL*. Each of these switches are connected at one end thereof to ground line 386 and at the other end thereof to a pull-up resistor such as resistor 422 which is connected to the voltage supply source $V_{CC}$ on line 392. Each switch 410–416 has a normally open contact which is connected to ground on line 386 when a magnet is placed in close proximity to the switch.

FIG. 10 shows the opto-isolator circuits 430 and 432 respectively used to condition signals from limit switch contacts 28a and 27a and produce the input signals NEUT* and PB*. Both circuits are identical in operation, and so only of the circuits will be described. Circuit 430 includes opto-isolator unit 434 including photodiodie 436 and phototransistor 438. Diode 440 protects photodiode 436 against accidental breakdown due to any reverse overvoltage which might be applied, while current-limiting resistor 442 ensures the photodiode 436 does not see excessive current during forward-biased operation. Pull-up resistor 444 is connected between the voltage supply $V_{CC}$ on line 392 and the collector of phototransistor 438 switch 28 is actuated as shown when mode lever 35 is in its N position. When switch 28 is released, its contact 28a is open and phototransistor 438 is off. Line 446 thus floats high (to the voltage level of supply $V_{CC}$). When it is in neutral, switch 28 is actuated as shown in closed, photodiode 436 and phototransistor 438 turn on, which sinks line 446 to near ground potential. Parking brake switch 27 is actuated and its contact 27a is closed when the parking brake lever 31 is applied. When contact 27a is closed, opto-isolator unit 432 is turned on, thus causing line 448 to be at near ground potential. When parking brake lever 31 is released, contact 27a is open, and line 448 floats high near the voltage level of supply $V_{CC}$.

Figure 11:
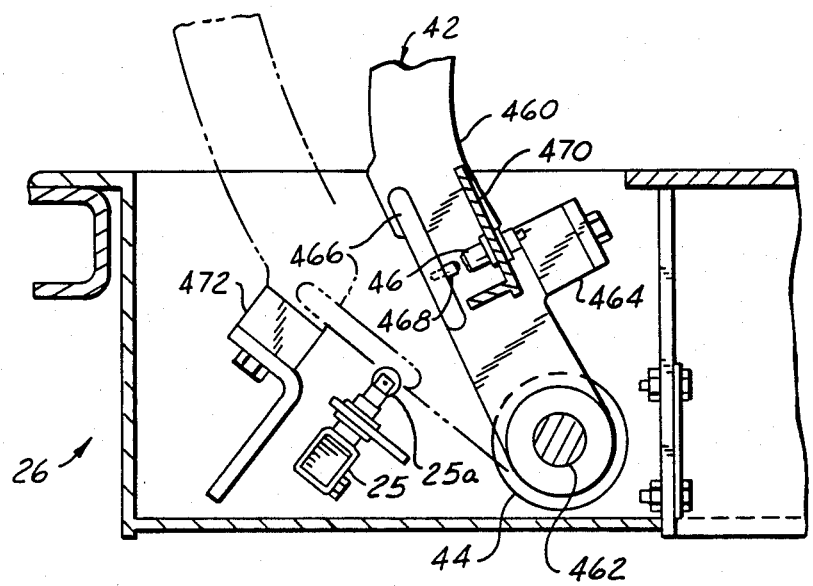
FIG. 11 is a fragmentary side view in partial cross-section of a clutch pedal assembly which may be used with the FIG. 1 control system.

FIG. 11 shows one possible mechanical construction for manual clutch engagement control 26. As partially shown in FIG. 11, control 26 includes lever 460 of clutch pedal 42 shown in FIG. 1. Lever 460 is mounted at its lower end to a shaft 462 to permit pivoting of lever 460 about the axis defined by shaft 462. A torsion spring assembly (not shown) mounted on the shaft 462 normally biases lever 460 in a clockwise direction upward toward the position defined by positive stop 464. Lever 460 has an outwardly extended flange 446 which carries permanent magnet 468. Clutch position sensor 46 is mounted on stationary bracket 470 so that magnet 468 is positioned adjacent to sensor 46 when lever 40 is in its normal upward position.

When the driver depresses the clutch foot pedal 42, lever 460 rotates in countercockwise direction about the axis defined by shaft 462. This causes magnet 368 to move away from sensor 46, thus causing a change in the output of the sensor as soon as the driver begins to depress the pedal. The movement of the lever 460 in the counterclockwise direction is limited by stop 472. When the clutch pedal is fully depressed (as shown in phantom in FIG. 11), flange 466 engages roller 25a of power switch 25, thus actuating switch 25. As has been discussed previously, the normally closed contact of power 26 permits power to be supplied to the +12 volt supply line 23 to solenoid valves 22a–22f (as best shown in FIG. 1). When the flange 466 engages roller 25a it causes power switch 26 to open, thus deenergizing solenoid valves 22a–22f which causes tranmsmission 20 to shift to neutral. Rotary-style potentiometer 44 is suitably coupled to lever 460 in a manner that makes its rotary shaft coaxial with the axis of shaft 462, thus allowing pot 44 to produce an analog signal on line 45 which varies linearly as a function of rotation angle of lever 460.

Figure 12:
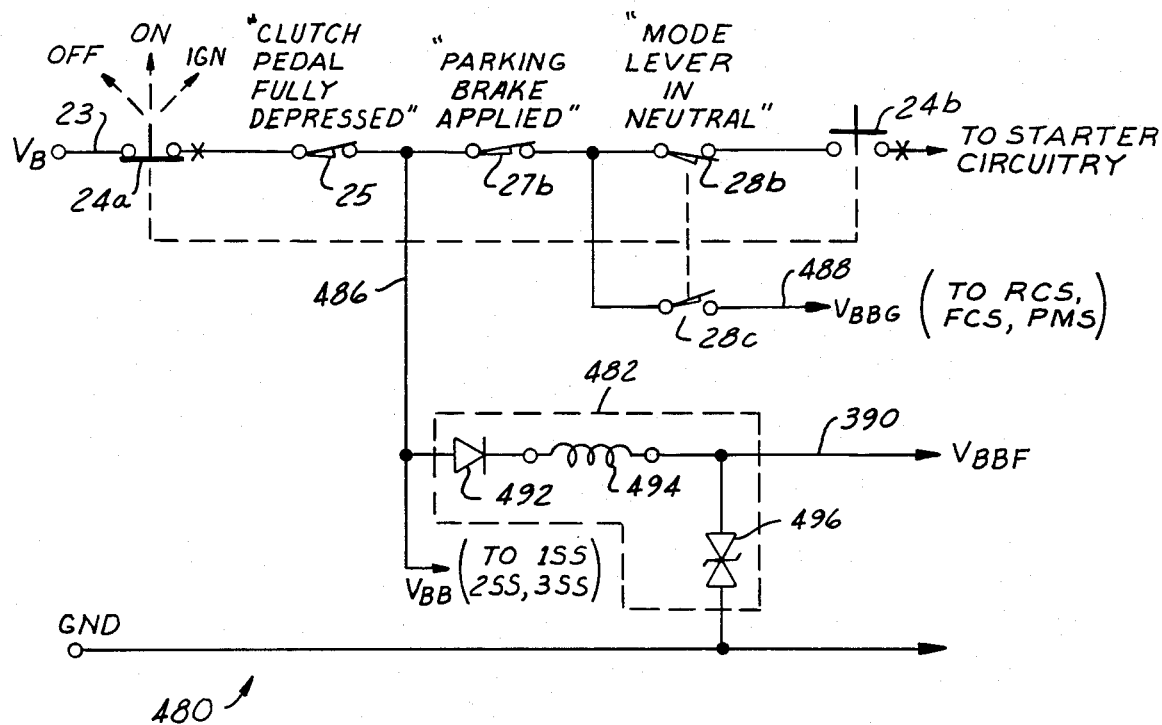
FIG. 12 is a schematic diagram of a circuit for providing power to the FIG. 8 control system.

FIG. 12 shows one possible circuit 480 interconnecting the various switches which provide power to the solenoids of valves 22, power supply 332 and vehicle starter circuitry. The components within dotted block 482 are part of power supply 332 shown in FIG. 8. Switch 24 is three-position switch, with its three positions from left to right being "OFF, ON and IGNITION (IGN)." The left (OFF) and center (ON) positions are detented, while the right (IGN) position is spring returned to the center position. In FIG. 12, two contacts 24a and 24b of switch 24 are shown. When switch 24 is in its OFF position, contact 24a is open, and when switch 24 is in the other two positions contact 24a is closed. Contact 24b is closed only when switch 24 is in its IGN position. Switch 25 is actuated, and its normally closed contact shown in FIG. 12 is open, only when clutch pedal 42 is fully depressed. Contact 27b of parking brake switch 27b is open any time parking brake lever 31 is applied, but is otherwise closed as shown in FIG. 12. Contact 28b of neutral safety start switch 28 is closed only when mode lever 35 is in netural, while an contact 28c is open only when mode lever 35 is in neutral. Those skilled in art will readily understand under when conditions the power may flow to the starter circuitry to line 486 connected to solenoids 1SS, 2SS and 3SS, and to line 488 connected to solenoids RCS, FCS and PMS. The diode 492, the choke 494 and varistor 496 are all provided to help protect electronic controller 30 against accidental reverse voltages and voltage spikes.

Figure 13:
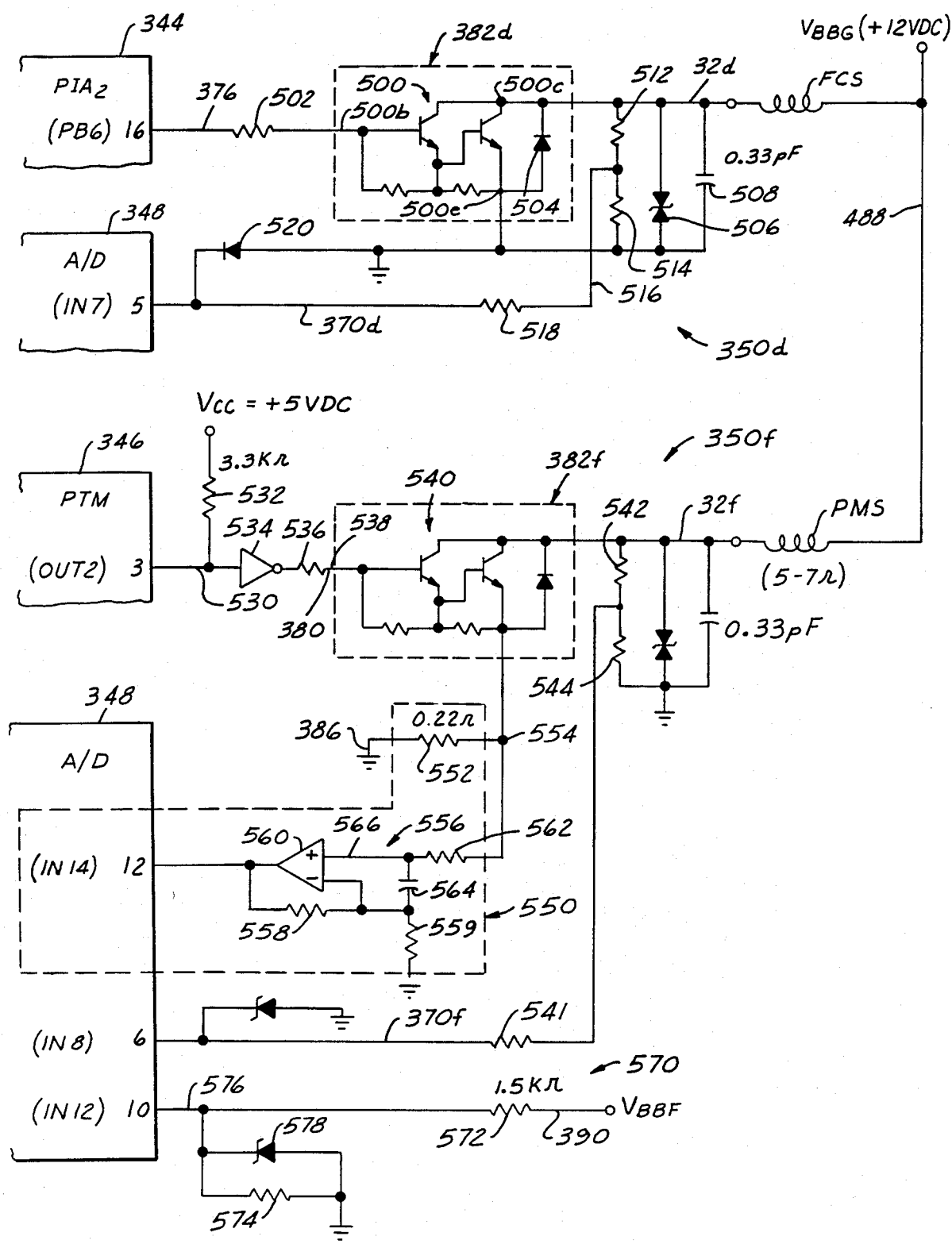
FIG. 13 is a detailed schematic diagram of two transmission solenoid driver circuits used in the FIG. 8 control system.

FIG. 13 is a detailed schematic diagram of the components used in the preferred embodiment of two individual transmission solenoid driver circuits, namely circuit 350d used to operate the forward clutch solenoid (FCS) of valve 22d, and driver circuit 350f used to operate the proportional modulation solenoid PMS of valve 22f. Each of the other solenoid drivers 350a through 350e is identical in construction to solenoid driver circuit 350d.

Solenoid driver circuit 350d includes amplifier 382d, which in the preferred embodiment of the present invention includes a Darlington pair power transistor 500 having its base terminal 500b connected to an output of I/O port 342 through resistor 502, its collector terminal 500c connected to solenoid control line 32d, and its emitter 500e connected to ground. Preferably, transistor 500 has a gain of about 2,200 and a five amp output capacity, thereby providing, when turned on, sufficient draw between collector 500c and emitter 500e to energize solenoid valve 22d. Connected between collector 500c and emitter 500e are diode 504, varistor 506 and capacitor 508. Diode 504 and varistor 506 protect transistor 500 against overvoltage conditions and inductive surges, especially those which occur when drive transistor 500 is turned off and the energy stored in the magnetic field about energized solenoid 22d is rapidly discharged. Capacitor 508 provides protection for amplifier 382d from radio frequency interference, ringing and other high frequency transients.

The solenoid driver circuit 35d also includes a feedback circuit by which the microprocessor 322 can monitor the operation of solenoid valve 22d and amplifier 382d. The feedback circuit includes a voltage divider made up of resistors 512 and 514 which is tapped at its center by line 516 to obtain a signal passed through resistor 518 to line 370d leading an input terminal of A/D converter 348. Zener diode 520 protects against voltage spikes to the input terminal of A/D converter 348. The feedback circuit permits monitoring of the solenoid 22d and its drive circuit 382d to ensure that they are operating as commanded.

Driver circuit 350f for solenoid 22f is very similar to the driver circuit 350d just described. Accordingly, only the differences between the two circuits will be explained. The input to amplifier 382f comes, not from second I/O port 342, but instead from a single line output of the programmable timer module 346. Pull-up resistor 532 is connected to the supply line $V_{CC}$ to keep line 530 high except when it is intentionally pulled low by output pin 3 of module 346. Buffer amplifier 534 inverts the signal on line 530 and delivers it through resistor 536 to the input terminal of Darlington pair power transistor 540 of amplifier 382f. The signal on line 538 is a positive logic version of the negative logic PWM signal produced by the programmable timer module 346, which operates under control of the microprocessor 322. As is well known to those in the art, a PWM signal alternates between two voltages (e.g., the supply voltage and ground) at a relatively high frequency, and has an average DC value proportional to its duty cycle, which can vary from 0% to 100%. Signal 538 rapidly turn amplifier 382f on and off, so that the solenoid control line 32f is also rapidly turned on and off, thus applying alternating PWM signal across the solenoid coil PMS which has an average DC value proportional to the duty cycle of the PWM signal. The voltage on line 32f is monitored by input pin 6 of the A/D converter 348 which receives a scaled-down voltage signal from line 370f which is connected through resistor 541 to the voltage divider made of resistors 542 and 544.

An additional feedback circuit 550 is provided in conjunction with driver circuit 350f in order to be able to monitor the amount of current actually flowing through the solenoid PMS. It is desirable to monitor the current flowing through solenoid PMS since this current is directly proportional to the magnetic flux responsible for moving and precisely positioning the solenoid plunger valve spool assemby of valve 22f that determines the precise size of the variable orifice in valve 22f. Circuit 550 includes precision shunt resistor 532 having a very low resistance (e.g., 0.22 ohms) in series between ground 386 and the emitter of power transistor 540 to provide a voltage signal at node 554 which is directly proportional to the amount of current flowing through solenoid PMS. This voltage signal is delivered to an analog input (pin 12) of A/D converter 348, but preferaby not until it is amplified by amplifier circuit 556, which may have a gain of about seven, as determined by feedback resistor 558 and connected between the output and negative input of operational amplifier 560, and by resistor 559 connected between the negative input and ground. This amplification gives the feedback signal from node 554 greater dynamic range at line 555, thus effectively increasing the sensitivity of A/D converter 348 with respect to detecting differences in the current flowing through the coil of solenoid PMS. Resistor 562 and capacitor 564 form a low-pass filter to remove unwanted high frequency noise from line 556 connected to the position input of amp 560.

Also shown near the bottom of FIG. 13 is a preferred signal conditioning and feedback circuit 570. Circuit 570 provides a scaled-down DC signal of the DC voltage signal $V_{BBF}$ from line 390 (which in turn is directly proportional to the DC voltage signal $V_{BBG}$ on line 488 which supplies DC power to solenoid PMS) to an analog input (pin 10) of A/D converter 348. Resistors 572 and 574 form a voltage divider network which scales down the $V_{BBF}$ signal to a suitable voltage range of line 576 for examination by A/D converter 348. Zener diode 578 protects the input circuit connected to pin 10 and within A/D converter 348 from transient overvoltages.

Software and the Controlling of Clutch Engagements (FIGS. 14 Through 18)

As will be readily appreciated by those in the art, the microprocessor 322 shown in FIG. 8 runs under control of a stored program placed in ROM module 330. The characteristics of the stored program important to an understanding of the present invention will now be explained with reference to figures which follow along with some general information regarding selected functions of the stored program. FIG. 14 is a generalized software flowchart which shows the five major segments of software code which makes up this stored program and their basic interrelationship. The five major sections are: restart code 580; neutral code 582; forward code 584; reverse code 586 and non-maskable interrupt (NMI) code 588. After a power-up indicated by arrow 590, detection of a low-voltage condition by detector circuit 334 as indicated by arrow 591 from input block 592, or watchdog timer 336 times out as indicated by arrow 593 from input block 594, microprocessor 322 is reset, as indicated by oval block 596. This causes microprocessor 322 to begin executing the restart code 580. During this time, the state of mode and pulser levers 335 and 337 are ignored, and all transmission solenoid valves 22 are turned off. Also, the following transparent electronic hardware tests and hardware configuration and initialization operations are performed: (a) the check sum of EPROM 330 is tested; (b) RAM 324 of microprocessor 322 is tested and cleared; (c) the two peripheral interface adapters 342 and 344 are tested and configured; and (d) the programmed timer module 346 is tested and configured. Upon completion of the restart sequence, the controller 30 will default to the limp home mode if any hardware problems were detected, and will provide an error code on display 50 if the mode lever 35 is out of the neutral position. If no hardware problems were detected by the microprocessor 322, and the mode lever 35 is in neutral, the microprocessor 320 will pulse a positive number, and then a negative number representing the forward and reverse gears (if any) which were stored in non-volatile memory 340 as a result of the memory gear feature.

The memory gear feature is the storage and recall of the last gear that the controller 30 had the transmission 20 in when power was last removed from the controller. In particular, controller 30 retains the shuttle-shift gear combination present at the time that power was removed in EEPROM 340. The shuttle-shift gear combination stored by the memory gear feature in memory 340 is preferably displayed only the first time that the controller 30 is in neutral after a power-up situation.

After the restart code 580 has been executed once, the controller 30 is turned over to the control of the neutral code 582. While executing, the neutral code 582 and the forward and reverse codes 584 and 586 periodically check the status of mode lever 35, as indicated by decision diamond 598 in FIG. 14, and the logic flow paths 602, 604 and 606 therein. When microprocessor 322 is executing the neutral code 582, controller 30 is said to be in the system neutral mode. In this mode, the speed clutch solenoid for the current gear pattern displayed on display 50 remains energized and all other transmission solenoids are off. The display 50 is caused to display the shuttle-shift gear combination for the last gear that the transmission 20 was engaged prior to entering neutral in according to controller 30. The display of the shuttle-shift gear combination preferably occurs as follows: (a) the forward speed gear is displayed (e.g., "2") for a first predetermined time interval; (b) the display 50 is cleared for a second predetermined interval; (c) the reverse speed gear is displayed (e.g., "−2") for a third predetermined interval; and (d) the display 50 is cleared for the second predetermined time interval; and (e) the sequence returns to step (a). All of these predetermined time intervals may be 0.5 seconds, if desired. The neutral mode is exited by the shifting of the mode lever 35 to either its forward position or its reverse position.

When the mode lever 35 is shifted to its forward position, microprocessor 322 begins to execute the forward code 584, and the controller 30 is said to be in the forward mode. In this mode, controller 30 allows the transmission 20 to operate in the forward direction in all forward gears (i.e., gears 1, 2, 3 and 4). As soon as the mode lever 35 is moved into its F position, the controller 30 engages the transmission 20 by turning on the appropriate speed clutch solenoid and the forward direction solenoid immediately. Gradual engagement of the forward directional clutch provides for smooth shifting from neutral into gear, or from one forward gear to another forward gear by either upshifting or downshifting. This gradual engagement is achieved by execution of a portion of the code known as the "PWM sequence," which will shortly be described. When in the system forward mode, display 50 preferably continuously displays the forward gear of operation, and updates the display periodically, and with every gear upshift or downshift. microprocessor 322 begins to execute the reverse code 586. When the microprocessor 322 is executing this code, and the controller 30 is said to be in the system reverse mode, which allows the transmission 20 to be operated in the reverse direction in all reverse gears (i.e., gears 1, 2, 3 and 4). When in this mode, display 50 preferably continuously displays the selected reverse gear of operation, periodically updating the display especially with every change of gear. After the mode lever 35 is moved into its R position, the transmission 20 is engaged by the controller 30 in the reverse mode by turning on the appropriate speed clutch solenoid and the reverse clutch solenoid immediately. Gradual engagement of the reverse directional clutch RDC provides for smooth shifting from neutral into gear, or from one reverse gear to another reverse gear by either upshifting or downshifting. The PWM sequence code is executed to provide this gradual engagement.

In the system forward mode and the system reverse mode, the actuation of the pulser lever into its UP position or DN position will cause a single upshift and or a single downshift respectively. Successive upshifts are allowed in either the system reverse or forward mode until the highest gear, which is fourth gear in the preferred embodiment of transmission 20, is obtained. Successive downshifts are also allowed in the system forward or reverse mode until the lowest gear, namely the first gear, is obtained. When controller 30 receives an upshift request by the movement of pulser lever 37 from its N to UP position, the microprocessor 322 will not generate an upshift command until the pulser lever 37 has remained in the UP position for a predetermined minimum number of milliseconds such as 50 milliseconds. After the controller 30 completes an upshift, a delay of another predetermined period of time, such as 0.5 seconds, is preferably required before another shift request will be allowed to occur. While the controller 30 is in the process of engaging a new gear, the display 50 will reflect the newly selected gear to which the transmission is being shifted.

If the mode lever 35 is in neutral, and a upshift (or downshift) request is received, the speed clutch solenoids will be energized (and de-energized) as required to match the requested gear. All other solenoids will remain unaffected.

The NMI code 588 is used to update the various software and hardware timers used within the controller 30. It is also used to update the time delays used to generate the PWM signal produced by programmable timer module 346 that is used to operate solenoid PMS. The NMI code 588 is executed whenever the microprocessor 322 receives a non-maskable interrupt from the programmable timer module 346, which occurs at 10 millisecond intervals. The execution of any code then executing will be suspended and control passes to the NMI code 588 as indicated by dotted lines 608 in FIG. 14. Once control has been passed to the NMI code 588, the microprocessor 322 will not allow the code to be interrupted by any other interrupt which may be received, since doing so would eventually skew the various timers and the external time base in PTM 346 used by for microprocessor 322. The execution of the NMI code 588 takes a relatively short period of time to execute. Once the NMI code 588 has been executed, control is passed back to the code segment which was interrupted, as indicated by dotted lines 609.

Referring now to FIG. 15, the PWM sequence used whenever shifting from neutral into a forward or reverse gear, or whenever upshifting, downshifting or shuttle-shifting, will be explained. The PWM sequence will not occur if mode lever 35 is in its N position when an upshift or downshift request is received. The PWM sequence is preferably set up as a subroutine callable from the forward code 584 and reverse code 586, which is called and executed whenever a certain bit flag is set. The big flag is set whenever microprocessor 322 recognizes from changes in the input signals UP*, DN* or transitions from the neutral code to forward code or the neutral code to the reverse code that the driver has requested any of the foregoing shifts. The execution of the PWM sequence results in the delivery of a PWM signal on line 380 to solenoid driven circuit 350f which energizes the coils of solenoid PMS in a controlled manner so as to reduce the hydraulic pressure being applied to the appropriate directional clutch which is engaging, or being allowed to re-engage, in order to provide a smooth transition from neutral or the previous gear to the desired gear.

For the sake of simplicity and ease of understanding the time diagram of FIG. 15 will be explained by way of example, namely the response of controller 30 to an operator request for a shift from neutral to a desired forward gear. The heavy line 612 represents the average value (or duty cycle) of the PWM signal applied on line 380 to driver circuit 350f for driving solenoid PMS. At time t0, a shift request occurs, and the controller 30 energizes the appropriate speed gear and direction solenoids immediately. Energization of the proportional solenoid PMS is delayed for a first period of time and remains at 0% duty cycle at line segment 614 shown on FIG. 15 as the period $T_1$ between times t0 and t1. In a preferred embodiment of the present invention, the allowed range of time for this delay is 0 to 200 milliseconds, which is selectable in 10 millisecond intervals due to the time base used by PTM 346. The purpose of this delay $T_1$ is to allow the filling of the speed gear clutch pack and the directional clutch pack with hydraulic fluid before the proportional solenoid PMS is energized to reduce the hydrauilc pressure to the directional clutch being engaged. As may best understood by referring to the hydraulic diagram in FIG. 5, the delay $T_1$ permits the selected speed clutch and the directional clutch to fill with hydraulic fluid using the substantially the entire fluid output of the hydraulic pump 184, thus minimizing the amount of time required to fill the clutches to be engaged. Thus time delay $T_1$ may conveniently be referred to as the clutch pack fast-fill delay.

At time t1, the proportional solenoid PMS is energized with a PWM signal having a 100% duty cycle which lasts as shown by line segment 616 until time t2 is reached. This second time delay $T_2$ may also be adjusted to any desired value in ten millisecond increments. In the preferred embodiment of transmission 20, the time delay $T_2$ has a value of 70 to 80 milliseconds. The 100% duty cycle effectively provides a DC voltage signal to the solenoid PMS which is substantially equal to the DC supply voltage $V_{BBG}$ provided on line 386, as shown in FIGS. 8, 12 and 13. In the preferred embodiment of transmission 20, the solenoid PMS has a nominal full voltage rating approximately or substantially equal to the nominal voltage value for the vehicle supply voltage, e.g., 12 volts DC (or 24 volts DC) depending upon the particular vehicle. the purpose of this second time delay $T_2$ is to provide sufficient time to allow a stabilized reading of the current passing through the solenoid coil PMS in response to a DC voltage signal of known magnitude to be taken. the current reading is taken at the end of time delay $T_2$ by measuring the voltage across hunt resistor 552 using feedback circuit 550 and A/D converter 348 as already explained with respect to FIG. 13. This current reading is used by microprocessor 322 in its calculations to compensate for the effect of variations in the temperature of solenoid 22f and the temperature of the hydrauilc fluid in transmission 20. These effects and the temperature compensation techniques employed by controller 30 will be explained in detail shortly.

At time t2, the proportional signal supplied to the coil of solenoid PMS is reduced down to a calculated value as shown at point 620 in FIG. 15, which has a magnitude which for convenience will be called DC-MAX. The value DC-MAX is calculated in accordance with formulas which will later be described. Briefly, the point DC-MAX represents the value at which the solenoid valve 22f must be operated in order to achieve a hydraulic pressure in the directional clutch at which sliding friction just begins to occur (or is about to occur) within its clutch pack, that is the pressure at which the clutch just begins (or is about to begin) initial sliding engagement where minimal torque transfer occurs. The value of DC-MAX is inversely proportional to the hydraulic pressure achieved by the clutch modulation pressure circuit 290 shown in FIG. 5. To achieve a smooth engagement, the average value or duty cycle of the PWM signal is steadily decreased as indicated by sloping line segment 622, so that the hydraulic pressure being applied to the directional clutch will steadily increases over a predetermined period of time $T_3$ between times t2 and t3. Once time delay $T_3$ is over at time t3, the duty cycle of the PWM signal being applied to the coil of solenoid PMS is reduced to 0% if it is not already at 0%. To achieve gradually increasing clutch pressure from time t2 to time t3, the gradually decreasing duty cycle is preferably reduced at a substantially linear rate of decay. The slope of the line segment 622 is the decay rate DR, and may be adjusted to achieve the desired speed of engagement while not creating unacceptable torque spikes or jolts. Alternatively, it may be set to allow a linear change between a DC-MAX value and a predetermined ending value of line segment 622 at time t3, such as zero to 40% duty cycle. For the preferred embodiment of transmission 20, the rate DR is set at some value between 4.5% and 27% per second, and the time delay $T_3$ maybe set to 1.5 seconds. If the directional clutch is not already fully engaged at time t3, the reduction of the duty cycle to 0% ensures that full hydraulic pressure is then applied to the clutch, thereby fully engaging the clutch.

In the preferred embodiment of the controller 30, the length of the time delays $T_1$, $T_2$ and $T_3$ are all variable either at the factory or in the field, or both. Typically the time delay $T_1$ may vary between 0 and 200 milliseconds. The time delay $T_2$ may be set as desired, for example, from 0.0 to 200 milliseconds, and the time delay $T_3$ may be varied from 0.1 seconds 10.0 seconds (or more) if desired. Also, the slope DR may be varied between minimum and maximum values as previously explained. The values of the time delays $T_1$, $T_2$ and $T_3$ and the decay rate DR are all preferably predetermined values which are stored in read-only memory 330 as fixed values. However, if desired, the values can be made more readily adjustable in the field by storing them in nonvolatile read/write memory 340 and providing keypad means or the like for programming them in the field, or by providing adjustable potentiometers or DIP switches which are manually set to a position corresponding to the desired value. Several potentiometers, which were read as analog inputs by A/D converter 348, were used in early prototypes of controller 30 to facilitate experimentation into the effects produced by various settings of DC-MAX, $T_1$, and DR upon the operation of transmission 20. Laboratory and/or field tests may be conducted for each type of transmission 20 installed in a specific type of vehicle to determine the optimal values of DC-MAX $T_1$, $T_2$, $T_3$ and DR for each gear shift or class of different shifts for the transmission/vehicle combination as will be explained with respect to FIG. 18.

An explanation how reading of the current flowing through the coil of solenoid PMS provides temperature information will now be given. The resistance of the coil of solenoid PMS changes considerably as a function of temperature. In particular coil resistance increases linearly as temperature increases. Thus, a steady signal applied to the solenoid PMS will produce a current through the solenoid coil which varies inversely with the operating temperature of the solenoid. Since the solenoid PMS is mounted on valve 22f in close proximity to the transmission 20, and since hydrauilc fluid regularly flows through valve 22f, the temperature of the solenoid coil provides an approximate indication of the actual operating temperature of the transmission 20. Accordingly, by measuring the current flowing through the coil of solenoid PMS in response to a steady voltage signal of predetermined magnitude, an indication of the temperature of transmission 20 can be obtained. In particular, the actual current obtained in response to this known temperature can be compared with the current which would be expected in response to the same signal applied when the transmission 20 is at its nominal operating temperature. The difference between the actual current reading and expected current reading varies inversely with the change in temperature from the nominal operating temperature of the transmission 20. The electronic controller 30 of the present invention includes all of the hardware requirements for determining approximately the actual temperature of transmission 20 or of solenoid PMS, if so desired. However, in the preferred embodiment of controller 30, the approximate actual operating temperature of the transmission 20 is never directly calculated, since this information is not needed in order to provide the desired temperature compensation function. Instead, the actual sensed current provided in response to the time delay $T_1$ is determined in a manner which will be further explained, and is compared against a nominal current value, which nominal value preferably represents the current expected when the transmission 20 is at its normal operating temperature.

In order to achieve a stabilized reading of current flowing through the coil of a proportional solenoid in response to a signal of known magnitude which faithfully relates to coil resistance, and therefore to the temperature of the coil, we determined that the current measurement must be made using a steady-state signal, preferably a full-voltage DC signal, rather than an alternating signal. Changing inductive effects disturbs the accuracy of the current reading when an alternating signal is used. In particular, a signal which allows the solenoid plunger to move unpredictably and continually change the effective inductance of the coil is troublesome. To achieve the DC signal preferred for reading current proportional to coil resistance, the proportional modulation circuitry of the present invention is commanded to produce temporarily during time delay $T_2$ a 100% duty cycle signal, which is effectively a DC signal over the time range of interest needed for making our measurement. If a current reading is taken when the solenoid plunger is still moving, it will not yield a stabilized current reading. Accordingly, the length of the time delay $T_2$ should be long enough to permit the solenoid plunger/valve spool to settle into its full-on condition and allow the transient currents associated with the changing inductance of the solenoid coil to substantially decay away before the current reading is taken. With the particular solenoid coil used in prototypes of transmission 20, transient current conditions were observed between up to 60 milliseconds after time t1. At 80 milliseconds, the current flowing through solenoid PMS is rising steadily at the exponential decay rate and is with in a few percent of its maximum final value. Thus, we found it best in prototypes of transmission 20, to take the current reading then at 80 milliseconds after time t1 which we used as the value of our preferred time delay $T_1$.

One important advantage of obtaining an indication of temperature of transmission 20 in the foregoing manner is that a separate temperature probe and circuit need not be supplied, thus saving cost and icreasing system reliability. Another significant advantage is that the effect of temperature changes on the performance of the transmission 20, due to changing viscosity of the hydraulic fluid or other factors, can be compensated for at the same time that changes in coil resistance of solenoid PMS are compensated for. By appropriately adjusting the duty cycle of the PWM signal used to drive solenoid PMS smooth clutch engagements can be provided, not only during operation at normal temperatures, but also immediately upon vehicle start-up, and while transmission 20 is warming up, in cold, warm or hot weather.

In addition to adjusting the values of delay times $T_1$ and $T_3$ and decay rate DR, the microprocessor 322 also adjusts the value of DC-MAX to compensate for changes in temperature of the solenoid PMS and the hydraulic fluid in transmission 20, and variations in the voltage supply, and variations in the magnetic flux coupling which can exist between the solenoid(s) adjacent to solenoid PMS. The motivation for compensating for temperature has been explained above. The motivation for compensating for variations in the voltage supply is to avoid having such variations unintentionally affect the clutch engagement pressure as determined by the operation of solenoid PMS. To lower cost and at the same time increase reliability, the controller 30 of the present invention does not use a separate highly regulated voltage supply to provide a controlled source of DC electrical power to the series combination comprised of solenoid PMS and its driver circuit 350f. The magnetic flux compensation is highly desirable to compensate for the effect upon solenoid PMS of the impingement of magnetic flux from solenoid FCS, which is generated whenever solenoid FCS is in its energized state, and which alters the intended position of the solenoid plunger of solenoid PMS as controlled by the PWM signal passed therethrough.

The three foregoing types of compensation used to alter the value of DC-MAX will now will be explained by reference to Equations 1 through 5 and 9 of the equations set forth in Table 4 below.

TABLE 4

| | | |
|---|---|---|
| DC-MAX = | $D_{NSV} + T_{CF} + V_{CF}$ | (1) |
| $D_{NSV} =$ | $D_{ISV} + M_{CF}$ | (2) |
| $T_{CF} =$ | $K_T[(I_N - I_A)/I_N]$ | (3) |
| $V_{CF} =$ | $K_V(V_N - V_A)$ | (4) |
| $M_{CF} =$ | $K_M(F_{ON})$ | (5) |
| $D_{ISV} =$ | $D_{MSV} + D_{FA}$ | (6) |
| $K_T =$ | $K_{TSV}(K_{TFA} - K_{TFC})$ | (7) |
| $K_V =$ | $K_{VSV} + K_{VFA}$ | (8) |
| $I_A =$ | $K_I(ADCH14/R_{SH})$ | (9) |

For ease of understanding the formulas, a brief explanation of each variable used in the nine formulas above is provided in Table 5 below.

TABLE 5

| SYMBOL | BRIEF DESCRIPTION |
|---|---|
| ADCH14 | Analog voltage value (sensed on channel 14 of A/D converter 348 - see FIG. 13) |
| DC-MAX | Initial duty cycle of PWM signal at time t2 (or time t6) during PWM sequence |
| $D_{FA}$ | Field adjustment to $D_{MSV}$ |
| $D_{ISV}$ | Initial starting value for DC-MAX (before any compensation) |
| $D_{MSV}$ | Starting value for DC-MAX (before field adjustment, if any) |
| $D_{NSV}$ | Nominal starting value for DC-MAX (before temperature and voltage compensation) |
| $F_{ON}$ | A binary variable (equal to "1" when solenoid FCS is on, and "0" when solenoid FCS is off) |
| $I_A$ | Actual current value (read at end of time delay $T_1$) |
| $I_N$ | Nominal current value - a constant (equal to current produced when full voltage DC signal applied to solenoid PMS at the end of time delay $T_1$ at a known temperature) |
| $K_I$ | Constant for scaling voltage-to-current conversion to obtain $I_A$ |
| $K_M$ | Constant for scaling $M_{CF}$ |
| $K_T$ | Constant for scaling $T_{CF}$ |
| $K_{TFA}$ | Field adjustment to $K_{TSV}$ |
| $K_{TFC}$ | Field constant used in field adjustment of $K_T$ |
| $K_{TSV}$ | Starting value for $K_T$ (before field adjustment, if any) |
| $K_V$ | Constant for scaling $V_{CF}$ |
| $K_{VFA}$ | Field adjustment value for $K_V$ |
| $K_{VSV}$ | Starting value for $K_V$ |
| $M_{CF}$ | Magnetic (flux) compensation factor |
| $R_{SH}$ | Value of shunt resistor 552 in ohms (see feedback ch FIG. 13) |
| $T_{CF}$ | Temperature compensation factor |
| $V_A$ | Actual voltage reading (equal to present value of $V_{BBF}$) |
| $V_{CF}$ | Voltage compensation factor |
| $V_N$ | Nominal voltage value - a constant (equal to nominal value of $V_{BBF}$) |

Equation 1 represents the final equation solved by microprocessor 322 is order to calculate the value of DC-MAX. DC-MAX is a combination of three values, namely $D_{NSV}$, the nominal starting value for DC-MAX, and $T_{CF}$ and $V_{CF}$, the compensation factors for temperature and voltage respectively. As shown in Equations 2 and 5, the nominal st ting value $D_{NSV}$ for DC-MAX includes the magnetic compensation factor $M_{CF}$. The variable $M_{CF}$ has a value of 0 or a constant $K_M$, depending upon the state of binary variable $F_{ON}$. Variable $F_{ON}$ is set to unity by microprocessor 322 when the solenoid FCS is energized, and is set to zero when the solenoid FCS is deenergized. Accordingly, the magnetic compensation factor $M_{CF}$ has a nonzero value only when solenoid FCS is energized.

Equation 3 shows how the value of temperature compensation factor $T_{CF}$ is calculated. The constant $I_N$ represents the nominal current value that is produced at the end of time delay $T_1$ when a full voltage DC signal (at the nominal voltage rating of $V_{BBG}$) is applied to solenoid PMS at a known tempeeature and with solenoid FCS denergized. This constant value may be determined by experimentation. The actual current value $I_A$ represents the current read at the end of time delay $T_1$. As previously explained with respect to FIG. 13, this current reading is obtained by passing the current flowing through solenoid PMS across a precision shunt resistor 552, amplifying it and presenting to channel 14 of A/D converter 348. Equation 9 shows the typical form of scaling and conversion of the digitized voltage reading obtained by A/D converter from its input channel 14 to the value $I_A$ used by microprocessor 322. The expression within brackets in Equation 3 is a decimal fraction indicating the amount of deviation of the actual current reading from the nominal current reading. The value of the expression within brackets is then multiplied by constant $K_T$ to scale the value of the bracketed expression as is required to produce the correct temperature compensation factor for the particular type of solenoid used for solenoid PMS and the type of hydraulic fluid in use in transmission 20. An appropriate value for scaling constant $K_T$ can be determined by experimentation, or by calculation (if the temperature coefficient of the coil resistance of solenoid PMS and the temperature coefficient for hydraulic fluid viscosity and its effect upon the intended operation of hydraulic fluid 210 of transmission 20 is known).

Equation 4 provides the calculations performed by microprocessor 322 in order to compute the voltage compensation factor $V_{CF}$. In Equation 4, the nominal voltage value $V_N$ is a constant corresponding to the nominal value of coarsely filter supply voltage $V_{BBF}$. The actual voltage $V_A$ in Equation 4 is equal to the present value of supply $V_{BBF}$ as determined by the operation of voltage feedback circuit 510 in conjunction with input channel 12 of A/D converter 348, as shown in FIG. 13. Those in the art will appreciate that it may be necessary to scale the digitized value received from analog input channel 12 of A/D converter 348 to obtain a value for $V_A$ actually equal to the present value of voltage $V_{BBF}$. In Equation 4, the difference between values $V_N$ and $V_A$ is multiplied by scaling constant $K_V$ to obtain the voltage compensation factor $V_{CF}$ used in Equation 1.

As illustrated by Equations 7 and 8, the scaling factors used in the equations, such as Equations 3 and 4, can be them themselves variables if desired. This is preferred as a technique for the initial fine-tuning of controller 30 to a particular transmission 20, and for fine-tuning controller 30 when used in combination with transmission 20 on a particular off-road vehicle. The vehicley's weight and loads and the dynamic operating conditions desired for transmission 20 can vary considerably, depending upon the particular vehicle and even upon the agricultural, construction or mining purpose to which the vehicle will be principally directed. Accordingly, we initially provided means in our prototypes for allowing the scaling factors, such as factors $K_T$ and $K_V$, to be adjusted with relative ease in a manner previously described using potentiometers or the like. Equations 7 and 8 demonstrate two different techniques for permitting field adjustment of these scaling factors. In Equation 8, the starting value $K_{VSV}$ of the voltage compensation scaling factor $K_V$ is permitted to be adjusting by summing a field adjustment value $K_{FVA}$ with the starting value $K_{VSV}$. It is preferred that microprocessor 322 be programmed to only allow the field adjustment value $K_{VFA}$ to have a value equal to a positive or negative predetermined decimal fraction of the starting value $K_{VSV}$, such as 0.3, thus limiting the amount of field adjustment which is permissible to be with a reasonable minimum and maximum. In Equation 7, the starting value $K_{TSV}$ for the temperature compensation scaling factor $K_T$ is adjusted by being multiplied by the difference between a field adjustment value $K_{TFA}$ and a center range constant $K_{TFC}$. The operation of the Equation 7 adjustment is best understood by considering an example where the field adjustment value $K_{TFA}$ may range between 0 and 20. The value of $K_{TFC}$ would then preferably be selected within the center of this range, i.e. 10, thus allowing the temperature compensation factor $K_T$ to be adjusted over any extremely wide positive or negative range, if desired. If such a wide range of adjustment is not desired, the predetermined minimum and maximum values of field adjustment value $K_{TFA}$ and the fixed value for the center range constant $K_{TFC}$ may be reduced to produce any desired range of allowable adjustment between a minimum and maximum for factor $K_T$.

Figure 16:
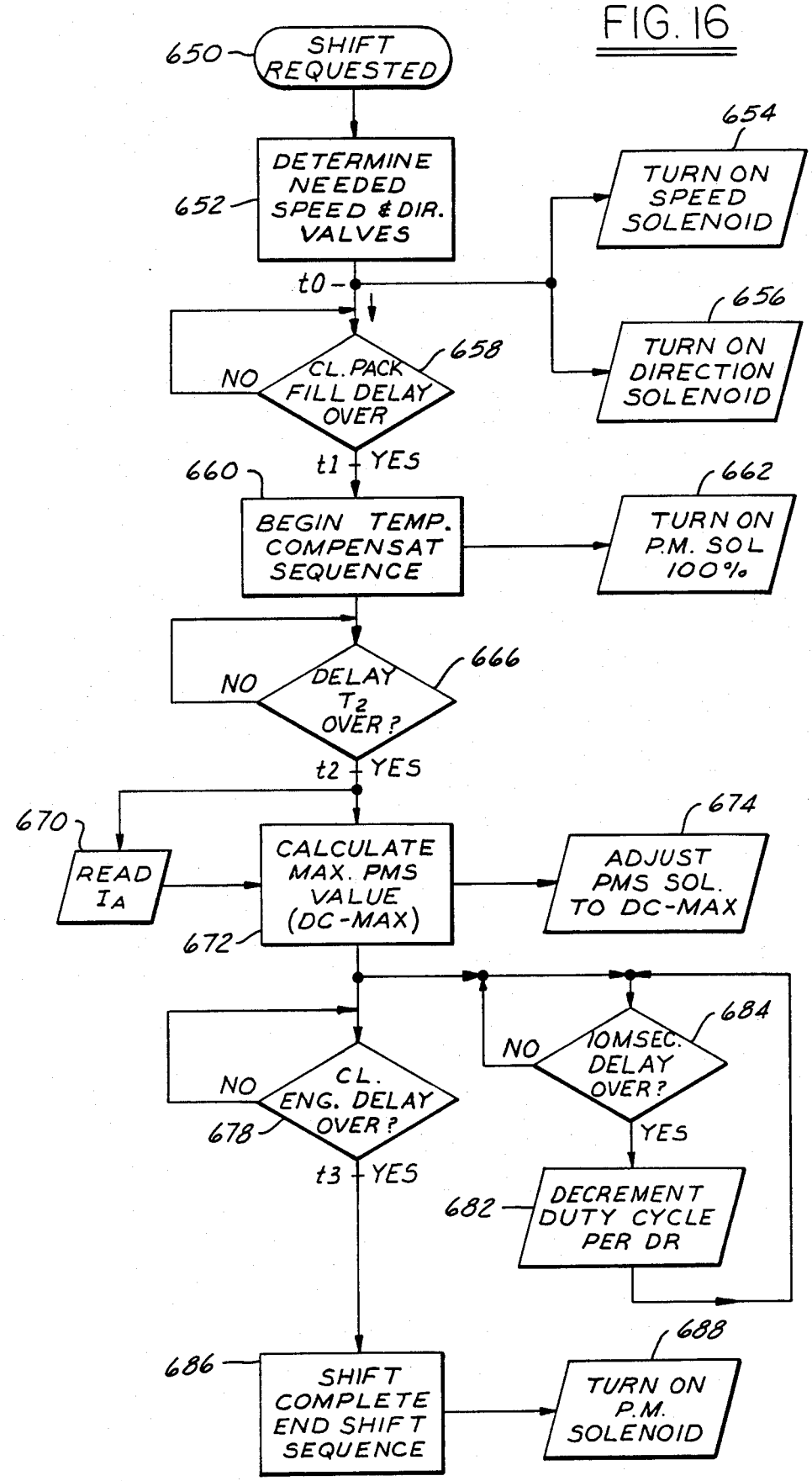
FIG. 16 is a detailed flowchart showing the general sequence followed by the software to produce the electrical signal shown in FIG. 15.

FIG. 16 is a detailed software flowchart showing the general features of the PWM sequence of operations carried out by microprocessor 322 under the control of the stored program and in response to a shift request, including reference to the calculation of the maximum duty cycle value DC-MAX just explained. On receiving a shift request as indicated by oval block 650, microprocessor 322 determines which speed clutch solenoid and directional clutch solenoid value to energize as indicated in block 652, and turns them on immediately as indicated by output blocks 654 and 656 at time t0. Then, as indicated by decision block 658, microprocessor 322 waits for the clutch pack fill delay (time delay $T_1$) to be over. During this time, microprocessor 322 beings the calculation associated with Equations 1–5 and 9 above. At the end of time t1 the microprocessor 322 beings a temperature compensation sequence as indicated by block 660 by driving solenoid PMS with a 100% duty cycle as indicated by block 662. When the time delay $T_2$ indicated by decision block 666 ends, the microprocessor 322 follows YES path 668 and reads the actual current $I_A$ at time t2, as indicated by input block 670, and thereafter complete the calculation of DC-MAX by using the value $I_A$ to finish solving Equations 9, 3 and 1. Using the just-calculated value for DC-MAX, microprocessor 322 adjusts the duty cycle of the PWM signal supplied to solenoid PMS to the value specified by DC-MAX, as indicated in output block 674. While waiting for the reduced pressure clutch engagement time delay $T_3$ to end, as indicated by decision block 678, microprocessor 322 decrements the duty cycle of the PWM signal applied to solenoid PMS in accordance with the decay rate DR at 10 millisecond intervals, as is indicated by output block 682 and decision diamond 684. Thus, if the time delay $T_3$ is 1.5 seconds long, for example, the duty cycle of the PWM signal will be reduced 150 times in accordance with the decay DR, thus providing a smooth steady increase in clutch engagement pressure as determined by clutch pressure modulation circuit 236 in FIG. 5. When time delay $T_3$ ends, the PWM sequence and shift of the transmission are complete, as noted in block 686, and accordingly the solenoid PMS is completely deenergized as indicated in output block 688.

FIG. 17 is a duty cycle vs. time graph very similar to that in FIG. 15 which shows an alternative technique for carrying out the PWM sequence. The heavy line 692 represents the average value of duty cycle of PWM signal applied on line 380 to the driver circuit 350f for solenoid PMS. For the sake of simplicity and ease of understanding FIG. 17, assume that the transmission 20 is in neutral prior to time t4 and that an upshift request for a forward gear is received at time t4. Accordingly, at time t4 the desired speed clutch and forward directional clutch are commanded to begin engagement by energizing the solenoid valves supplying hydraulic fluid to those clutches. In order to take the reading of the actual current through solenoid PMS required for performing temperature compensation, the solenoid PMS is energized with a 100% duty cycle signal beginning at time t4 and lasting until time t5 as indicated by line segment 696. In interval between times t4 and t5 corresponds to the time interval $t_2$ between times t1 and t2 in FIG. 15, and is preferably 80 milliseconds long. At time t5 the solenoid PMS is deenergized as indicated by line segment 694 to allow the pressure reducing valve 240 to return to its normal full-open position, thus allowing a maximum flow rate therethrough to hydraulic line 272 in order to permit the directional clutch pack to be engaged to fill quickly with hydraulic fluid. At time t6, this process (which corresponds to time delay $T_1$ in FIG. 15) is complete and the clutch pack is ready to begin frictional engagment. At this point, the solenoid valve PMS is turned on by providing a PWM signal initially having the value DC-MAX as indicated by point 700 to reduce the hydraulic pressure in hydraulic line 272 to a desired minimal value where the clutch pack of the directional clutch just begins to achieve frictional sliding engagement. Thereafter, the hydraulic pressure in line 272 is increased by allowing the PWM duty cycle to decay as indicated by sloping line segment 706, in the same manner as in FIG. 15. At time t6, the duty cycle defaults to 0% if it is not alreadyat 0%. The time delay between time t5 and t6 corresponds to time delay $T_3$ in FIG. 15.

The ability of electronic controller 30 to have many values stored in one or more tables, arrays or other data structures in its memory 330 and almost instantly access them as needed, makes it possible to customize each individual parameter relevant to the operation of transmission 20 by electronic controller 30 to an optimal value for each gear shift. In a preferred embodiment of electronic controller 30, a table (or other suitable data storage structure) may be provided to adjust key parameters which do (or may have) a bearing upon the smoothness of a clutch engagement associated with any particular gear shift. FIG. 18 shows one such table 720 which has seven columns and thirty rows. Table 720 illustrates how key parameters can be customized for all conceivable gear shifts which a powershift transmission, such as transmission 20, could experience during normal operation. Columns 1 and 2 specify the gear shift associated with a particular row, with column 1 representing the state of the transmission before the gear shift, and column 2 representing the state of the transmission after the gear shift. Columns 3 through 6 would normally contain the actual values of key parameters to be used by controller 30 during the PWM sequence for each gear shift of particular transmission/vehicle combination. The parameters respectively associated with columns 3-6 are: time delay $T_1$, $D_{NSV}$ (the nominal value for DC-MAX after compensation for magnetic compensation and before compensation for temperature or voltage), decay rate DR, and time delay $T_3$. In order to more fully illustrate the present invention, hypothetical values are shown in columns 3-6. (The selection of specific values for the parameters in columns 3-6 does not form part of the present invention.)

The first sixteen rows of able 720 are for normal one-gear shifts, either up or down, including shifts into and out of neutral. Rows 17-24 are for shuttle-shifts, and rows 25-30 are for skip-shifts. Column 7 indicates the number of clutches to be filled with respect to each of the gear shifts. For example, the row 1 shift from neutral to first gear forward requires the filling of two clutches, namely forward directional clutch and the first speed gear clutch 1SC. Each of the shifts in rows 2-4 and 6-8 require the filling of only one clutch pack, a speed clutch pack, since the appropriate directional clutch is already filled prior to the gear shift. Row 5 and 13 are included in table 720 only for illustration and completeness, since there is no need to execute the PWM sequence depicted in FIGS. 15 and 16 when shifting to neutral.

In those situations where there are more basic factors which influence the various values for a key parameter, it may be desirable to calculate the desired values for the key parameter from those more basic factors rather than storing values in a table. For example column 7 indicates the number of clutches to be filled for each particular gear shift specified in a row. If it requires 75 milliseconds to fill one of the directional clutches $F_{DC}$ and $R_{DC}$, and only 55 milliseconds to fill one of the smaller speed clutches 1SC-4SC, and the value of time delay $T_1$ is only based upon the types and numbers of clutches to be filled, the value of time delay $T_0$ could be calculated simply by knowning how many clutches and which types of clutches are being engaged for any particular gear shift. An inspection of columns 3 and 7 will show that all of the values shown in column 3 can be readily calculated from the foregoing two basic values of 55 milliseconds and 75 milliseconds. In a similar manner, the nominal starting values $D_{NSV}$ for DC-MAX shown in column 4 may be calculated in a simple fashion since all forward shifts require a setting of 75%, while all reverse shifts require a setting of 85%. Accordingly, those in the art will appreciate that alternative data structures and additional formulas may be used for storing and/or calculating the values of key parameters to be changed with each individual gear shift from more basic factors, rather than storing them in a large table like table 720. In any event, by using tables or other suitable data structures, by themselves or in combination with formulas, such as those provided in Equations 1-9 or other formulas, the controller 30 of the present invention may provide for adjustment of any of the parameters mentioned herein which influence or would help optimize the clutch engagement associated with every individual gear shift to which transmission 20 is subjected. Thus, those in the art will appreciate that microprocessor-based controller 30 operating under program storage with memory means for the storage of desired values of key parameters provides an extremely flexible and easy-to-adjust electronic control system for powershift transmission employing proportional actuation devices, such as proportional solenoid valves to modulate clutch engagement pressure or other hydraulic parameters such as flow rate.

Figure 19:
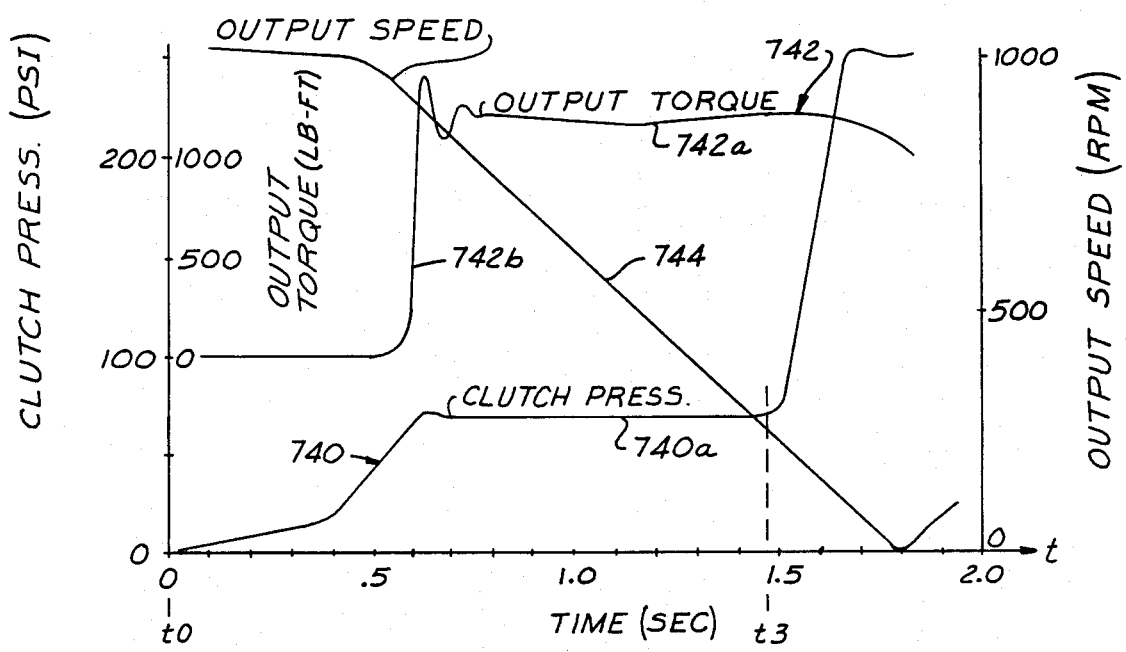
FIGS. 19–21 are graphs showing hydraulic clutch pressure, vehicle output speed, and transmission output torque as a function of time illustrating the effect of the various FIG. 18 parameters, with FIG. 19 illustrating the effect of a substantially constant, reduced clutch pressure during clutch engagement, FIG. 20 showing the effect of introducing a delay in the reduction of substantially constant clutch pressure during clutch engagement, and FIG. 21 showing the effect of a constantly increasing clutch pressure in addition to the time delay illustrated by FIG. 21.
Figure 20:
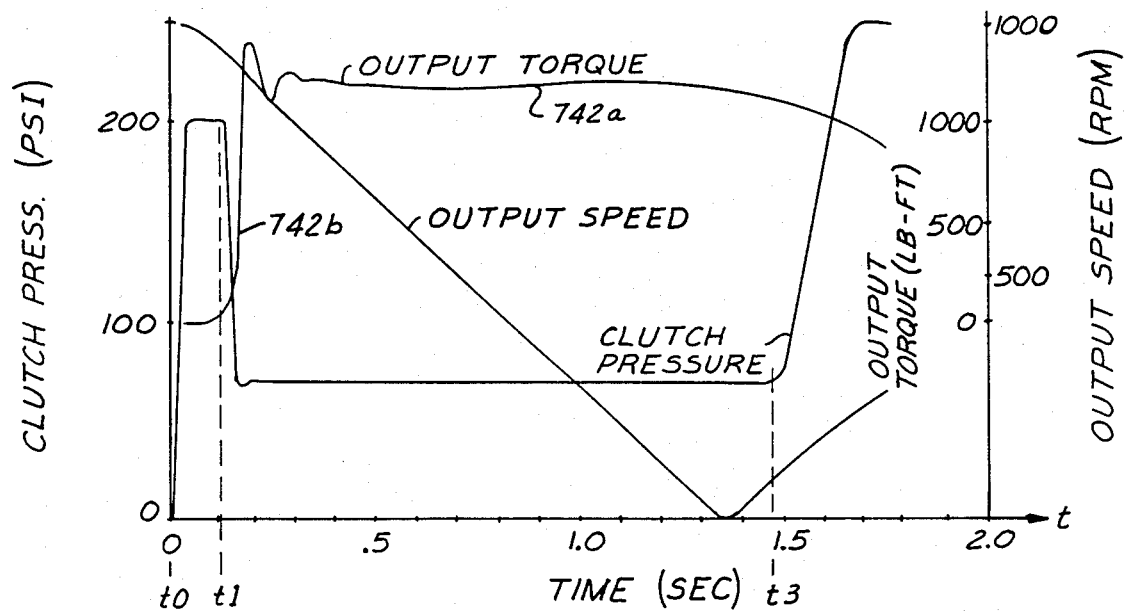
Figure 21:
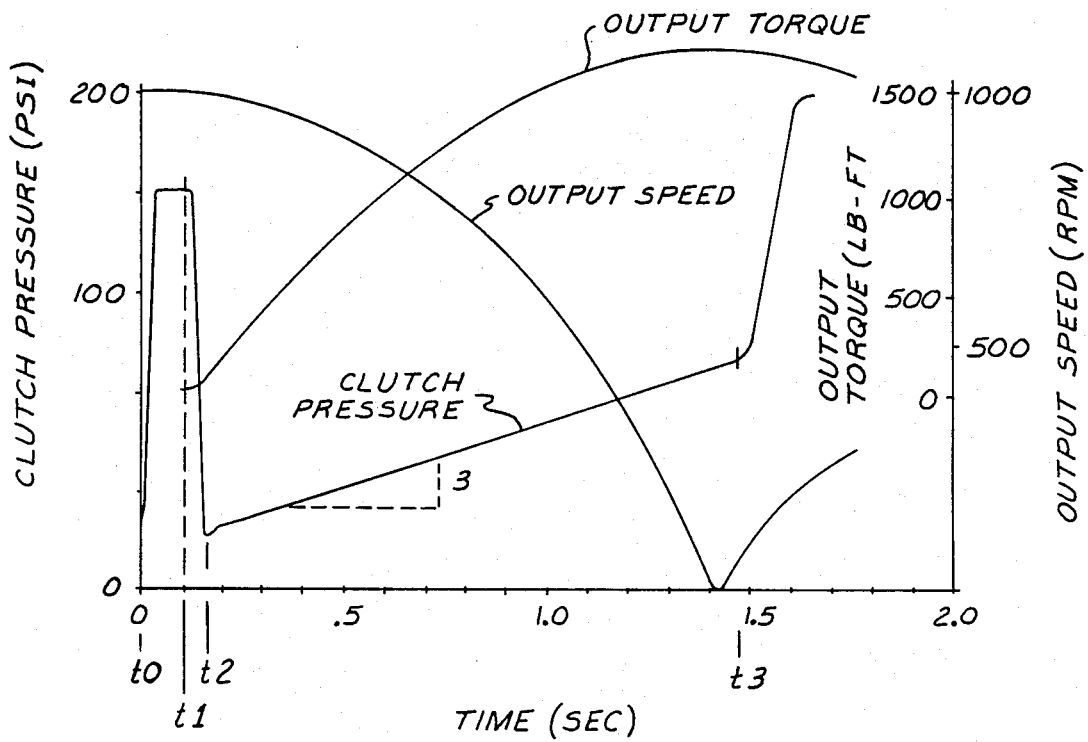

Simulation Results Illustrating Controller's Utility (FIGS. 19-21)

FIGS. 19 through 21 are graphs showing the hydraulic pressure bearing upon a directional clutch being engaged, vehicle output speed, and transmission output torque as a function of time, These graphs illustrate the effect of some of the key parameters controlled by the PWM sequence upon transission 20 and in a simulated vehicle application. The graphs of FIGS. 19-21 represent full power reversals or shuttle-shifts from a selected forward gear to a selected reverse gear. The two general criteria established for vehicle response for FIG. 19 are: (1) during a direction change the vehicle's acceleration shall be constant and not exceed 0.3 g's; and (2) there shall be no appreciable time lag (i.e., a lag greater than 200 milliseconds) between the time the operator commands a direction change and the time the vehicle responds.

The data provided in FIGS. 19-21 is from tests of a prototype of electronic controller 30 of the present invention in use with a prototype of the Funk 5000 Series transmission (i.e. transmission 20) that was used to drive a flywheel which simulates the inertia of a 52,000 pound rubber-tired loader vehicle. In the tests, the transmission-flywheel combination was operated at a speed that simulates the loader traveling at 7 miles per hour in the forward direction and then being shifted into a reverse direction. FIG. 19 shows, as a function of time, a cure 740 depicting directional clutch engagement pressure, curve 742 depicting output torque, and a curve 744 depicting simulated vehicle output speed. In the test associated with FIG. 19, the shift request was received at time t0, at which time solenoid FCS of the forward directional clutch FDC was deenergized, solenoid RCS of the reverse direction cutch RDC was energized, and the solenoid PMS of valve 22f was supplied with a PWM signal having a duty cycle of approximately 60%. This duty cycle was maintained until time t3 (that is, for approximately 1.5 seconds) after which time the duty cycle was allowed to rapidly decay, thereby allowing the clutch pressure to clutch RDC to full recover. Maintaining a constant duty cycle on solenoid PMS provided a constant clutch pressure as shown in curve portion 740a, and resulted in a nearly constant output torque a shown in portion 742a of curve 742. Furthermore, the constant output torque resulted in a constant flywheel (vehicle) acceleration of 0.27 g's, thus satisfying the first criteria.

However, the second criteria was not satisfied. As seen in FIG. 19, approximately 0.6 seconds were required to fill the reverse directional clutch RDC, and thus begin torque transmittal. In order to decrease tihs time lag, the time delay $T_1$ was provided, so that although the directional and speed clutch solenoids were being energized immediately upon receipt of the the shuttle-shift request at time t0, the solenoid PMS was not energized until after time delay $T_0$ approximately 130 milliseconds). By not immediately energizing solenoid PMS, the higher pressure available through hydraulic line 272 filled the directional clutch RCD at a faster rate. FIG. 20 shows the resulting improvement.

At this point, as a result of parallel testing on an actual vehicle with a prototype of controller 30 and transmission 20, it became apparent that the first general criteria, namely constant acceleration, required modification. This was due to the fact that the sharp rise in torque seen at curve portion 742b in FIGS. 19 and 20 up to its "constant value" at curve portion 742a was causing an undesirable jerk. In other words, the rate of change of acceleration was too high. The acceleration criteria was then modified as follows: (1) the vehicle acceleration during a directional change shall not exceed 0.5 g's; and (2) the rate of change of vehicle acceleration shall not excess 0.5 g's per second. In order to meet this modified criteria, the values of parameters (such as DC-MAX) within the prototype electronic controller 30 were again modified, and a gradually decreasing duty cycle (namely the decay rate DR) was introduced during time delay $T_3$ following the time delays $T_1$ and $T_2$. By allowing the duty cycle to gradually decrease, a gradual increase in clutch engagement pressure was provided as shown in curve portion 750a of clutch pressure curve 750 in FIG. 21. These changes resulted in a gradually increasing output torque as shown in curve 752 and an acceptable output speed response shown in curve 754 of FIG. 20.

FIGS. 19-21 thus demonstrate in a graphic manner that advantages of utilizing a microprocessor-based electronic controller 30 wherein the values of key parameters affecting the clutch engagement process are easily alterable so that the transmission can be readily tailored to the requirements of different vehicles and applications.

Epilogue

While the foregoing detailed description was concerned a powershift transmission 20 which has four forward gears and four reverse gears, those skilled in the art will appreciate that the teachings of the present invention are equally applicable to other powershift transmissions, such as the Funk 2000 Series transmission which has six forward gears (and two forward directional clutches), and three reverse gears (and one reverse directional clutch). As long as the directional (or other) clutches being engaged have a proportional actuator means, such as clutch pressure modulation circuit including a proportional solenoidoperated valve (or an equivalent thereof), the various aspects of the electronic control system of the present invention may be beneficially applied to provide smooth clutch engagement by modulating the hydraulic pressure of such engagement. Also, while controller 30 operated only one proportional actuator means, it may if desired or necessary be provided with additional PWM signal-generating means to handle a plurality of proportional actuator means.

In a broader sense, various aspects of the present invention, such as the temperature compensation and measurement techniques discussed herein, the techniques for compensating for magnetic flux amongst solenoids, and the voltage compensation schemes, all may be advantageously utilized with powertransmitting apparatuses used for or in heavy duty off-road vehicles such as farm tractors, road graders and front-end loaders. For the sake of helping construe the appended claims and more properly defining the present invention, definitions of several terms will now be provided.

As used herein the term "power-transmitting apparatus" encompasses: transmission and internal combustion engines of all types (including those used in any type of commercially available, self-power land-based vehicles); implements, power-take-off ("PTO") attachments and any type of powered accessory for or used in conjunction with a sturdy motorized vehicle; and hydrauilcally-operated controls or systems associated with any of the items mentioned above in this sentence.

As used herein, the term "off-road vehicle" includes any mobile vehicle which is principally used in the agriultural construction equipment or mining industries. Such off-road vehicles includes but are not limited to tractors, front-end loaders, back hoes, power shovels, bulldozers, road graders, and heavy-duty dump trucks.

As used herein, the term "power shift transmission" includes a relatively heavy-duty power transmission unit having at least one rotatable power input shaft and one rotatable power output shaft which may be coupled together in power-transmitting relation by the selective engagement of one or more hydraulically actuated clutches and gears associated therewith operated by electrically-operated hydraulic valves.

As used herein, the term "electrically-operated hydrauilc valves" includes solenoid-operated hydraulic valves or the like which have coils, electric windings or any other type of electrically actuated operators.

As used herein, the term "alternating electrical signal" includes in general pulsating signals having a general periodic or repetitive waveform, such as rectangular waveforms, triangular waveforms including softtooth waveforms, sinusoidal waveforms, and in particular includes those waveforms which have a net DC component, such as the PWM signals discussed herein.

As used herein, the term "microprocessor means" includes microprocessors, microcomputers, and digital electronic systems utilizing one or more LSI or VLSI integrated circuits operable under program control.

The foregoing detailed description shows that the preferred emeobidments of the present invention are well suited to fulfill the objects above stated. It is recognized that those in the art may make various modifications or additions to the preferred embodiments chosen to illustrate the present invention without departing from the spirit and proper scope of the present invention, which is defined by the appended claims, including all fair equivalents thereof.

We claim:

1. An electronic control system for a powershift transmission having a plurality of hydraulically-actuated clutches and a plurality of electrically-operated hydraulic valves for selecting the clutch for engagement, each such valve being provided with electrical coil means for operating the valve, the control system comprising:

first electrical switching means for providing a first electrical signal to a first electrical coil means associated with a first hydraulic valve for selecting a first clutch of the transmission for engagement;

second electrical switching means for providing a second electrical signal which is proportional signal to a second electrical coil means associated with a second hydraulic valve for adjusting the hydraulic pressure applied to the first clutch during engagement thereof;

microprocessor means for operating the powershift transmission in accordance with operating parameters stored within the microprocessor means, the operating parameters including a first parameter corresponding to a reduced hydraulic pressure to be applied to the first clutch during initial engagement thereof, the microprocessor means including first output means for controlling the first electrical switching means, second output means for controlling the second electrical switching means, and means for causing the second electrical signal to command the second hydraulic valve to adjust the hydraulic pressure applied to the first clutch during the initial engagement thereof in accordance with a stored value of the first parameter;

wherein the second electrical signal is a pulse width modulated (PWM) signal;

wherein the first signal electrical coil means are solenoid coils, and wherein the first and second electrical switching means are substantially identical in construction;

means for providing a predetermined time delay between the application of the first electrical signal to the first electrical coil means and the application of the second electrical signal to the second electrical coil means; and wherein the operating parameters stored within the microprocessor means includes a second parameter corresponding to the rate at which hydraulic pressure applied to the first clutch during engagement thereof is to be increased from the reduced pressure applied during the initial engagement of the first clutch, and a third parameter corresponding to the maximum length of time reduced hydraulic pressure is to be applied to the first clutch during engagement thereof, and the microprocessor means includes means for causing the second electrical signal to command the second hydraulic valve to increase the hydraulic pressure applied to the first clutch during engagement thereof from the reduced pressure applied during the initial engagement thereof in accordance with a stored value of the second parameter, and means for causing the second electrical signal to command the second hydraulic valve to apply reduced hydraulic pressure to the first clutch during engagement thereof in accordance with a stored value of the third paramenter.

2. An electronic control system for a powershift transmission having a plurality of gears having different gear ratios, a plurality of hydraulically-actuated clutches for engaging and disengaging the gears by locking and unlocking the gears to shafts within the transmission, and a plurality of electrically-operated hydraulic valves for selectively actuating the clutches, each such valve being provided with electrical coils means to operate the valve, the control system comprising:

first electrical switching means for providing a first electrical signal to a first electrical coil means associated with a first hydraulic valve for selecting a first clutch of the transmission for engagement;

second electrical switching means for providing a second electrical signal to a second electrical coil means associated with a second hydraulic valve for selecting a second clutch of the transmission for engagement;

third electrical switching means for providing a third electrical signal which is a proportional signal to a third electrical coil means associated with a third hydraulic valve for adjusting the hydraulic pressure applied during the engagement of the first clutch and during the engagement of the second clutch;

microprocessor means for operating the powershift transmission in accordance with operating parameters stored within the microprocessor means, said operating parameters including first and second stored values of a first parameter corresponding to a desired characteristic of hydraulic operation to be achieved during engagement of the first clutch and during engagement of the second clutch, the first and second values being distinct from one another, said microprocessor means including first output means for controlling the first electrical switching means, second output means for controlling the second electrical switching means, third output means for controlling the third electrical switching means, and means for causing the third electrical signal to command the third hydraulic valve to adjust the hydraulic pressure applied during engagement of the first and second clutches respectively in accordance with the first and second values of the first stored parameter;

wherein the values of the first stored parameter represent the hydraulic pressures to be applied during initial engagement of the first and second clutches;

wherein the first, second and third electrical coil means are solenoid coils, and wherein the third electrical signal is a pulse width modulated (PWM) signal;

means for providing a first predetermined time delay between the application of the first electrical signal to the first electrical coil means and the application of the third electrical signal to the third electrical coil means; and means for providing a second predetermined time delay between the application of the second electrical signal to the second electrical coil means and the application of the third electrical signal to the third electrical coil means; and wherein the operating parameters stored within the microprocessor means includes a second stored parameter corresponding to the rate at which hydraulic pressure applied to the first clutch during engagement thereof is to be increased from the reduced pressure applied during the initial engagement of the first clutch, and a third stored parameter corresponding to the maximum length of time reduced hydraulic pressure is to be applied to the first clutch during engagement thereof.

the microprocessor means includes means for causing the third electrical signal to command the third hydraulic valve to increase the hydraulic pressure applied to the first clutch during engagement thereof from the reduced pressure applied during the initial engagement thereof in accordance with the value of the second stored parameter, and means for causing the third electrical signal to command the third hydraulic valve to apply reduced hydraulic pressure to the first clutch during engagement thereof in accordance with the value of the third stored parameter.

3. A control system as in claim 2, wherein:

the operating parameters stored within the microprocesor means include first and second stored values of the third parameter respectively corresponding to the maximum length of time reduced hydraulic pressure is to be applied to the first clutch and to the second clutch during engagements thereof; and the microprocessor means includes means for causing the third electrical signal to command the third hydraulic valve to apply reduced hydraulic pressure to the first clutch and to the second clutch during engagements thereof in accordance with respective stored values of the third parameter.

4. A control system as in claim 2, wherein:

the operating parameters stored within the microprocessor means include first and second stored values of the second parameter respectively corresponding to the rate of which hydraulic pressure to be applied to the first clutch and to the second clutch during engagements thereof is to be increased from the reduced pressures applied during the initial engagements of the respective clutches; and the microprocessor means includes means for causing the third eletrical signal to command the third hydraulic valve to increase the hydraulic pressure applied to the first clutch and to the second clutch during engagements thereof from the reduced pressure applied during the initial engagements thereof in accordance with the respective stored values of the second parameter.

* * * * *